(12) United States Patent
Desai et al.

(10) Patent No.: US 11,706,345 B1
(45) Date of Patent: Jul. 18, 2023

(54) ANSWER TIME PREDICTION IN A CONTACT CENTER SERVICE OF A PROVIDER NETWORK

(71) Applicant: Amazon Technologies, Inc., Seattle, WA (US)

(72) Inventors: Prashant Desai, Land O Lakes, FL (US); Parind Surendra Poi, Dallas, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/538,551

(22) Filed: Nov. 30, 2021

(51) Int. Cl.
*H04M 3/00* (2006.01)
*H04M 3/523* (2006.01)
*G06N 20/00* (2019.01)
*H04M 3/51* (2006.01)

(52) U.S. Cl.
CPC .......... *H04M 3/5238* (2013.01); *G06N 20/00* (2019.01); *H04M 3/5175* (2013.01); *H04M 3/5232* (2013.01); *H04M 2203/403* (2013.01)

(58) Field of Classification Search
CPC ............. H04M 3/5238; H04M 3/5175; H04M 3/5232; H04M 2203/403; G06N 20/00
USPC ....... 379/265.01–265.14, 266.01–266.1, 309
See application file for complete search history.

(56) References Cited

U.S. PATENT DOCUMENTS

| 10,987,463 | B2 * | 4/2021 | Schug | A61M 3/0279 |
| 2020/0374400 | A1 * | 11/2020 | Adibi | H04M 3/5141 |
| 2021/0064436 | A1 * | 3/2021 | Calmon | G06F 9/5016 |
| 2022/0027837 | A1 * | 1/2022 | D'Attilio | H04M 3/5175 |
| 2022/0182493 | A1 * | 6/2022 | Ter | H04M 3/5238 |
| 2022/0218222 | A1 * | 7/2022 | Kermani | G01R 33/5611 |

* cited by examiner

*Primary Examiner* — William J Deane, Jr.
(74) *Attorney, Agent, or Firm* — Nicholson De Vos Webster & Elliott LLP

(57) ABSTRACT

Computer-implemented techniques for answer time prediction in a contact center service of a provider network. While a delayed processing timing has not been met, a set of contact queuing context-actual answer time data for a set of contact inquiries serviced is received as a first set of contact queuing context-actual answer time data. When the delayed processing timing has been met, a new queuing model is learned based on the first set of contact queuing context-actual answer time data and a previous set of contact queuing context-actual answer time data for a previous set of contact inquiries serviced or a previous version of the queuing model. A request to predict an answer time for a target contact queuing context is received and an answer time for the target contact queuing context is predicted based on the new queuing model. The predicted answer time is provided to a contact via a contact communications channel.

20 Claims, 8 Drawing Sheets

ANSWER TIME PREDICTION IN A CONTACT CENTER SERVICE OF A PROVIDER NETWORK

BACKGROUND

A cloud provider network, or just "provider network," can offer an omnichannel contact center service. The service allows a business to provide an omnichannel communications experience to their contacts (e.g., customers of the business) and their contact support agents that handle contact inquiries without the business having to provision underlying software, compute, network, and telephony resources that implement the service. The contact center service may provide a unified experience to the contacts and the agents across various communications channels. The unified experience may allow agents to handle contact inquiries from a unified user interface and permit a contact inquiry to start via one communications channel (e.g., chat) or with one agent and move to a different communications channel (e.g., voice) or a different agent while preserving conversation context across the move.

The communications channels can include telephony-based communications channels and chat-based communications channels. Telephony-based channels can include toll-free numbers and direct-in-dial (DID) numbers supported by the public switched telephone network (PSTN). Chat-based communications channels include voice-based or text-based conversational user interfaces for computers for turn-based communications with a human or artificial agent. The voice-based conversational user interface might be provided in an electronic device such as a mobile phone, an in-home device, a smart speaker, or other electronic device with microphone, audio speaker, and data network communications capabilities. The text-based conversational user interface could be web-based such as in a web browser application, a mobile application, or other web-based client-side software application.

BRIEF DESCRIPTION OF DRAWINGS

Various embodiments in accordance with the present disclosure will be described with reference to the drawings, in which.

DETAILED DESCRIPTION

Figure 1:
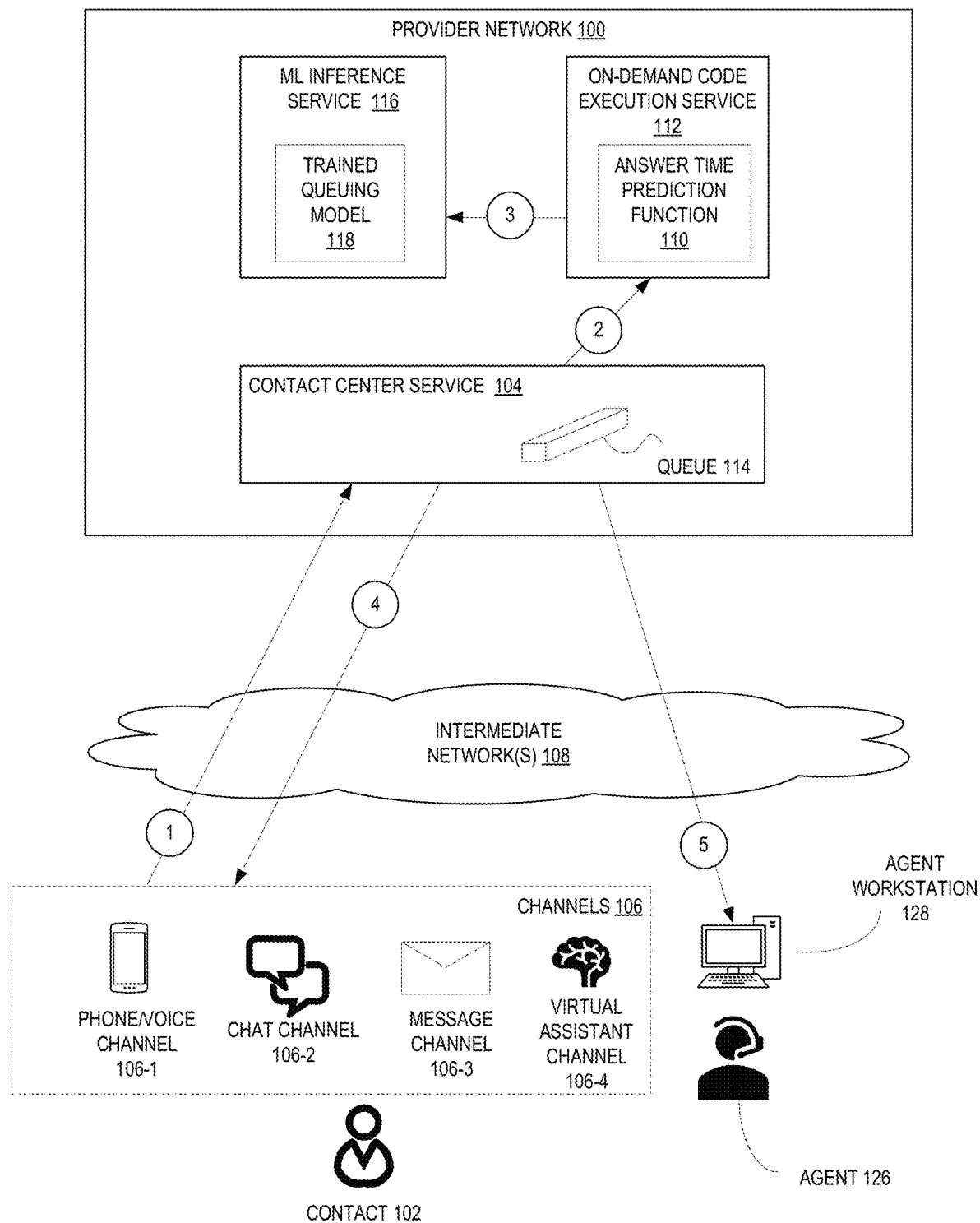
FIG. 1 is a diagram illustrating an environment for answer time prediction in a contact center service of a provider network using a trained queuing model, according to some embodiments.

Many businesses provide products or services that require contacts (e.g., customers of the business) to wait in queues. The waiting process can have a significant impact on the perceived quality of the service. With a queue where the contact is physically located in the queue such as a queue for a cash register in a physical retail location, the contact can relatively easily estimate how long the wait is going to be because the progress of the queue is perceptible to the contact. However, with a queue where the contact is virtually located in the queue such as an online contact service queue of a provider network, the contact may not be able to easily estimate the wait time. The contact might know their position in the queue, but not how long each contact in front of them is going to need for their inquiry to be serviced. An unknown wait-time can be a source of anxiety for contacts. Providing an accurate estimated wait time to contacts in queues is important to ameliorate anxiety.

Even if the number of contacts ahead of a contact in a queue is known, the accuracy of wait time predictions is important. If a prediction is too short, then the contact may become frustrated or possibly even believe they were lied to. If the prediction is too long, then the contact might consider an alternative or a rival company instead. Accurate wait time prediction is especially important in a contact center service of a provider network since inaccurate predictions reflect poorly not just on the provider network but also the business using the provider network to provide the contact center service to their contacts.

The accuracy of wait time predictions can be vitally important to the perception of quality of a contact center service of a provider network and, by extension, to the perception of quality of the businesses that use the contact center service to provide contact center services to their customers. The provider network may provide the contact center service to many businesses with a different agent staffing levels, contact types, agent schedules, and contact inquiry volume. So, flexibility is needed. Along with the need for flexibility, there is a need for accuracy in wait time predictions.

The techniques herein provide accurate answer time predictions with the flexibility to handle different queuing scenarios, using a delayed modeling of relationships between previous contact queuing contexts and corresponding actual answer times. By doing so, the techniques improve the operation of a contact center service offered by a provider network. At each delayed modeling of a batch of previous contact queuing contexts and corresponding actual answer times, a new queuing model is learned. In the queuing model, a contact queuing context for which an answer time prediction is sought using the model is sometimes termed herein a "target" contact queuing context and a previous contact queuing context from which the model is learned in the delayed modeling fashion is sometimes termed a "historical" contact queuing context. After the delayed modeling, the new queuing model is used to predict answer times for target contact queuing contexts. In some embodiments, at each delayed modeling of a batch of previous contact queuing contexts and corresponding actual answer times, the set of previous contact queuing contexts included in the batch are selected according to a set of configurable queuing model parameters.

As used herein, the term "answer time," in some variations, encompasses or represents generally the time between when a contact is added to a queue and when the contact is routed to an agent who is available to then begin servicing the contact's contact inquiry, or colloquially, the "wait time" in the queue. An "answer time prediction," in some variations, encompasses or represents a predicted amount of time from a reference time to when a contact is routed to agent who is available to begin servicing the contact's contact inquiry. The reference time can be a current time such as a time corresponding when the contact is about to be added to the queue, a time corresponding to when the contact has just been added to the queue, or a time corresponding to when the contact is added to the queue. In this case, an answer time prediction is sometimes referred to herein as an "initial" answer time prediction. However, the current time can be some time after the contact has been waiting in the queue (sometimes referred to herein as an "updated" answer time prediction).

As an example of the problem addressed by the techniques herein, consider a provider network that provides contact center services to a governmental agency and a travel and hospitality provider. The government agency and the travel and hospitality provider may have different agent staffing levels, different contact inquiry patterns, and different queuing patterns. For example, the governmental agency may have significantly reduced agent staffing levels outside the hours of 9:00 am to 5:00 pm Monday through Friday, while the travel and hospitality provider may offer 24/7 guest and property management support services. At the same time, contact inquiry patterns for the governmental agency may be more predictable with agent demand peaking in the afternoons on the early weekdays, while demand for guest and property management support services of the travel and hospitality provider may be more irregular or spread over all days of the week. Due to the variance in agent staffing levels, contact inquiry patterns, and queuing patterns, it is very difficult to develop a single queuing model that would accurately predict answer times for both the government agency and the travel and hospitality provider. As such, the flexibility to use separate queuing models for answer time prediction is very important. This flexibility is not only important for the provider network, which may get more businesses to subscribe to their contact center service, but also to the business users who accrue customer goodwill by providing customer contacts accurate answer times. If inaccurate answer times are provided, it might cause customers to become dissatisfied with the business's product or service. The techniques herein provide the flexibility to learn separate queuing models for accurate answer time prediction for different agent staffing levels, different contact inquiry patterns, and different queuing patterns that may vary from business to business and industry to industry.

The techniques herein use a machine learning-based approach in which relationships between historical contact queuing contexts and actual queue answer times are learned. Each historical contact queuing context corresponds to a contact with a contact inquiry that was serviced through a contact center queue, or just a "queue." When learning the relationships between a set of historical contact queuing contexts and corresponding actual queue answer times, a set of one or more queuing features of each historical contact queuing context may be used. The set of historical contact queuing contexts from which to the relationships are learned may be selected according to a set of one or more configurable queuing model parameters to account for different queuing scenarios where, as alluded to above, the scenarios may differ depending on the type of industry (e.g., education, energy, finance, food and beverage, government, health care, insurance, logistics, marking and media, retail, technology, telecom, travel and hospitality, etc.). The different queuing scenarios may encompass different agent staffing levels, different contact inquiry volume and patterns, different contact service levels, etc. The techniques herein provide, using configurable queuing model parameters and machine learning, the ability to learn relationships between historical contact queuing contexts and actual queue answer times in different queuing scenarios and with the flexibility to accurately predict answer times in each of those different scenarios.

Generally speaking, the techniques proceed by receiving batched data resulting from a set of one or more agents servicing a set of one or more queues of many previous contact inquiries. For example, hundreds of contact inquiries may have been queued and serviced by the set of agents on one or more previous days and the context of all of those may be processed at one time to create a new queuing model of the set of queues to be used for predicting answer times for those set of queues going forward. The prediction of answer times using the new model can be made in realtime or closer to realtime such as in response an arrival of a new contact to one of queues.

The techniques herein may rely on a machine learning regression model (e.g., a Linear Regression (LR) model, a Support Vector Machine (SVM) model, a Regression Tree (RT) model, a Random Forest Regressor (RF) model) or another machine learning model (e.g., a Gradient Boosting Machine (GBM) model, an Elastic Net (EN) model, a Bagging model, a Neural Network (NN) model) that can be learned from and leverage selected features of historical contact queuing contexts and their associated actual answer times without having to rely on possibly unrealistic assumptions of a queuing theory model. A queuing theory model is a mathematical model of queue operation in which assumptions about contact inter-arrival time and service time are incorporated into the mathematical model. For example, a queuing theory model may assume both contact inter-arrival times and service times have an exponential distribution. While the techniques may be used in lieu of a queuing theory model, the techniques may be used in conjunction with a queuing theory model. As an example of one of many possible implementations, a queuing theory model may be used with the techniques disclosed herein in a Kalman filter or other recursive Bayesian filter-based implementation to account for any statistical noise in the machine learning-based answer time predictions made over time using the techniques herein.

FIG. 1 illustrates a process for predicting an answer time in a contact center service of a provider network. At a high-level, the process has five steps labeled within circles as 1, 2, 3, 4, and 5 in FIG. 1.

In summary, the process proceeds at Step 1 by contact 102 initiating a contact inquiry with contact center service 104 in provider network 100 via a contact inquiry communications channel 106 such as phone/voice communications channel 106-1 or chat communications channel 106-2 and over intermediate data communications network(s) 108. The contact inquiry initiation is received at contact center service 104 of provider network 100. At some point, contact center service 104 determines that contact 102 should be placed in contact center queue 114 while waiting for agent 126 to become available to service the contact inquiry.

At Step 2, before, after, or contemporaneous with placing contact 102 in queue 114, contact center service 104 invokes answer time prediction function 110 with on-demand code execution service 112. When executed, prediction function 110 collects a set of queuing metrics about the current contact queuing context and uses the set of queuing metrics to generate a set of queuing features representing the target queuing context for which an answer time prediction is desired.

At Step 3, prediction function 110 invokes (requests) machine learning (ML) inference service 116 to perform ML inference using trained queuing model 118 and with the set of queuing features representing the target queuing context provided by prediction function 110 as input to trained queuing model 118.

At step 4, an output of performing ML inference using queuing 112 is provided to contact 102 via a communications channel (e.g., 106-1 or 106-2). The output includes an answer time prediction for queue 114.

The prediction is returned to inform contact 102 of the estimated amount of time that contact 102 will need to wait until agent 126 can begin handling the contact inquiry of contact 102 at Step 5.

As an example, consider a financial services company that uses contact center service 104 to provide contact center services to contact 102 where contact 102 is a customer of the company and agent 126 is employed by the company. Contact 102 may use phone/voice channel 106-1 or chat channel 106-2 to request to interact with a human agent of company to resolve a disputed charge on a credit card issued to contact 102 by company. For example, if contact 102 is using phone/voice channel 106-1, contact 102 may have dialed a toll-free number and subsequently selected an option, either aurally or via the phone keypad, to speak with a customer service representative of the company. As another example, if contact 102 is using chat channel 106-2, contact 1-2 may have typed the request into a computer graphical user interface. In any case, in response to the request to interact with a human agent, the process of FIG. 1 may be performed to accurately inform contact 102 via channel 106-1 or 106-2 how long contact 102 will need to wait in queue 114 until agent 126 can start the interaction with contact 102.

Contact center service 104 may provide an answer time prediction to contact 102 at other times. For example, an answer time prediction can be provided to contact 102 upon an express request for the prediction communicated to service 104 from a personal electronic device of contact 102 via a communications channel 106. Alternatively, service 104 may periodically provide an updated answer time prediction to contact 102 while contact 102 is waiting in queue 114 to ameliorate any anxiety of the contact 102 that queue 114 has not progressed since contact 102 received an initial answer time prediction. For example, service 104 may periodically provide an updated answer time prediction in a web page or in a mobile application at a personal electronic device of contact 102. For example, the graphical user interface of the web page or mobile application may be automatically periodically refreshed with updated answer time predictions received at the personal electronic device from service 104 over network(s) 108 using an HTTP/S long polling mechanism or the like. The process of FIG. 1 may be used to make these, and other answer time predictions described herein.

In many of the examples herein, ML inference service 116, on-demand execution service 112, and contact center service 104 are provided by the same provider network. In some embodiments, ML inference service 116 or on-demand code execution service 112 are provided by a different provider network or different provider networks than the provider network that provides contact center service 104. In these embodiments, provider networks and services thereof may be interconnected by intermediate network(s) 108.

Returning to the top of FIG. 1, a provider network 100 generally adheres to a "cloud" computing model that enables ubiquitous, convenient, on-demand network access to a shared pool of configurable resources such as networks, servers, storage applications, and services. The resources can be rapidly provisioned and released with minimal management effort or service provider interaction. A customer of provider network 100 may be able to unilaterally provision computing capabilities in provider network 100, such as server time and network storage, as needed automatically without requiring human interaction with each service provider.

Capabilities of provider network 100 may be available over intermediate network(s) 108 and accessed through standard mechanisms that promote use by heterogeneous thin or thick client platforms such as mobile phones, tablets, laptops, and workstations. Computing resources such as storage, processing, memory, and network bandwidth in provider network 100 may be pooled to serve multiple customers using a multi-tenant model, with different physical and virtual resources dynamically assigned and reassigned according to customer demand There may be a sense of location independence in that the customer generally may have no control or knowledge over the exact location of provided resources but may be able to specify location at a higher level of abstraction such as, for example, at the level of a country, state, or datacenter.

Provider network 100 may automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the customer of a utilized service.

Provider network 100 may provide its capabilities to customers according to a variety of different service models including Software-as-a-Service ("SaaS"), Platform-as-a-Service ("PaaS"), and Infrastructure-as-a-Service ("IaaS").

With SaaS, a capability is provided to a customer using the provider's software applications running on the infrastructure of provider network 100. The applications may be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the customer does not manage or control the underlying infrastructure including network, servers, operating systems, storage, or individual application capabilities, except for limited user-specific application configuration settings. With PaaS, the customer is provided the capability to deploy onto hardware and software infrastructure of provider network 100 customer-created or acquired applications using programming languages, libraries, services, and tools supported by the provider or other sources.

Typically, under the PaaS model, the customer does not manage or control the underlying hardware and software infrastructure including network, servers, operating systems, or storage, but has control over the deployed applications and possibly configuration settings for the application-hosting environment.

With IaaS, the customer is provided the capability to provision processing, storage, networks, and other fundamental computing resources where the customer can deploy and run arbitrary software, which can include operating systems and applications. The customer does not manage or control the underlying hardware and software infrastructure but has control over operating systems, storage, and deployed applications and possibly limited control of selecting network components such as, for example, host firewalls.

Provider network 100 may provide its capabilities to a customer according to a variety of different deployment models including as a private cloud, as a community cloud, as a public cloud, or as a hybrid cloud.

In a private cloud, the hardware and software infrastructure of provider network 100 is provisioned for exclusive use by a single organization which may comprise multiple customers (e.g., business units). The private cloud may be owned, managed, and operated by the organization, a third party, or some combination of them, and it may exist on or off premises.

In a community cloud, the hardware and software infrastructure of provider network 100 is provisioned for exclusive use by a specific community of customers from organizations that have shared concerns such as mission security requirements, policy, and compliance considerations. The community cloud may be owned, managed, and operated by one or more of the organizations in the community, a third party, or some combination of them, and it may exist on or off premises.

In a public cloud, the infrastructure is provisioned for open use by the public. The public cloud may be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to customers, provider network 100 may rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 108 (e.g., the Internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Contact center service 104 (or "cloud contact center 104") enables a business to create an omnichannel contact center in provider network 100. An omnichannel contact center may provide a unified experience for one or more contacts (e.g., contact 102) and one or more agents (e.g., agent 126) across a one or more communications channels 106 including one or more telephony channels (e.g., phone/voice channel 106-1), one or more chat channels (e.g., chat channel 106-2), one or more messaging channels (e.g., message channel 106-3), and one or more virtual assistant channels (e.g., virtual assistant channel 106-4). In some variations, contact center service 104 allows agent 126 of a business to receive a telephone call from contact 102 and allows for agent 126 to make a phone call to contact 102. In doing so, provider network 100 may manage the telephony infrastructure on behalf of the business. Such infrastructure may include carrier connections, redundancy, and routing. Contact center service 104 may host portable toll-free or direct-in-dial (DID) numbers of the business. Contact center service 104 also allows contact 102 to chat with agent 126 from a web or mobile application. Agent 126 may use a single user interface at agent workstation 128 to correspond with contact 102 using phone/voice 106-1 or chat 106-2 communications channels.

Contact 102 and agent 126 may communicate with each other via chat communications channel 106-2 by typing or otherwise entering text into a computer user interface at their respective electronic devices or selecting user interface options where the selections are reflected in the other's user interface. In some embodiments, contact center service 104 may support voice chat via chat channel 106-2. In this case, contact 102 may communicate with an agent by spoken language where contact center service 104 uses speech-to-text technology to transform the audio signal data received from the contact 102's electronic device representing the spoken words of contact 102 into text. The text is then presented to agent 126 at agent workstation 128. Text entered by agent 126 into the user interface at agent workstation 128 may be transformed by contact center service 104 into speech signals that can be sent to the contact 102's electronic device and electronically aurally read out there (e.g., through an electronic audio speaker of contact 102's device).

A business may create one or more routing profiles with contact center service 104. Contact center service 104 uses a routing profile to link an agent (e.g., agent 126) with a queue (e.g., queue 108). In some embodiments, each agent is assigned to one routing profile and a routing profile can have multiple agents assigned to it. A routing profile may specify a set of one or more queue names and for each queue, the types of communications channels supported. For example, a routing profile may specify two queues named "Queue 1" and "Queue 2" where Queue 1 supports both phone and chat, and Queue 2 supports just chat.

As used herein, a "queue" represents a waiting area of contact center service 104 that holds contacts to be answered by an agent. The waiting area can be implemented by contact center service 104 using a linear list or set of data structure elements and associated computer-executable logic for operating on the elements in which elements encompass data representing the contacts in the queue and their order within the queue and possibly other metadata (e.g., the priority and the delay of the queue).

A priority and a delay of a queue may be specified in a routing profile that names the queue. If the routing profile names multiple queues, then the priority of the queues determines which queue is serviced by an agent before other queues. For example, consider a group of agents assigned to a "Sales" routing profile. The Sales routing profile may name a "Sales" queue with priority 1 and a "Support" queue with priority 2. In this case, contacts in the lower priority Support queue are routed to an agent when there are no contacts in the higher priority Sales queue.

A queue in a routing profile may also be associated with a delay (e.g., in seconds) with priority taking precedence over delay. In this case, if there is a contact in a queue associated with a delay (e.g., a delay greater than zero) and all higher priority queues are empty, then the contact is routed to an agent only after the contact has been waiting in the queue for at least the delay amount of time. For example, consider a group of agents assigned to a "Support" routing profile. The Support routing profile may name a "Tier 1 Support" queue with priority 1 and a delay of zero seconds, a "Tier 2 Support" queue with priority 2 and a delay of twenty seconds, and a "Tier 3 Support" queue with priority 3 and a delay of eighty seconds. In this case, a contact in the Tier 2 Support queue may be routed to an agent when the contact has been waiting in the queue for at least twenty seconds and the Tier 1 Support queue is empty. Likewise, a contact in the Tier 3 Support queue may be routed to an agent when the contact has been waiting in the queue for at least eighty seconds and both the Tier 1 and the Tier 2 Support queues are empty.

A business that uses contact center service 104 may wish to route contacts to agents based on certain criteria such as, for example, the skill of the agent. To support this, contact center service 104 may allow the same routing profile to be assigned to multiple agents, allow multiple queues to be assigned to a routing profile, and allow a queue to be assigned to multiple routing profiles.

Figure 2:
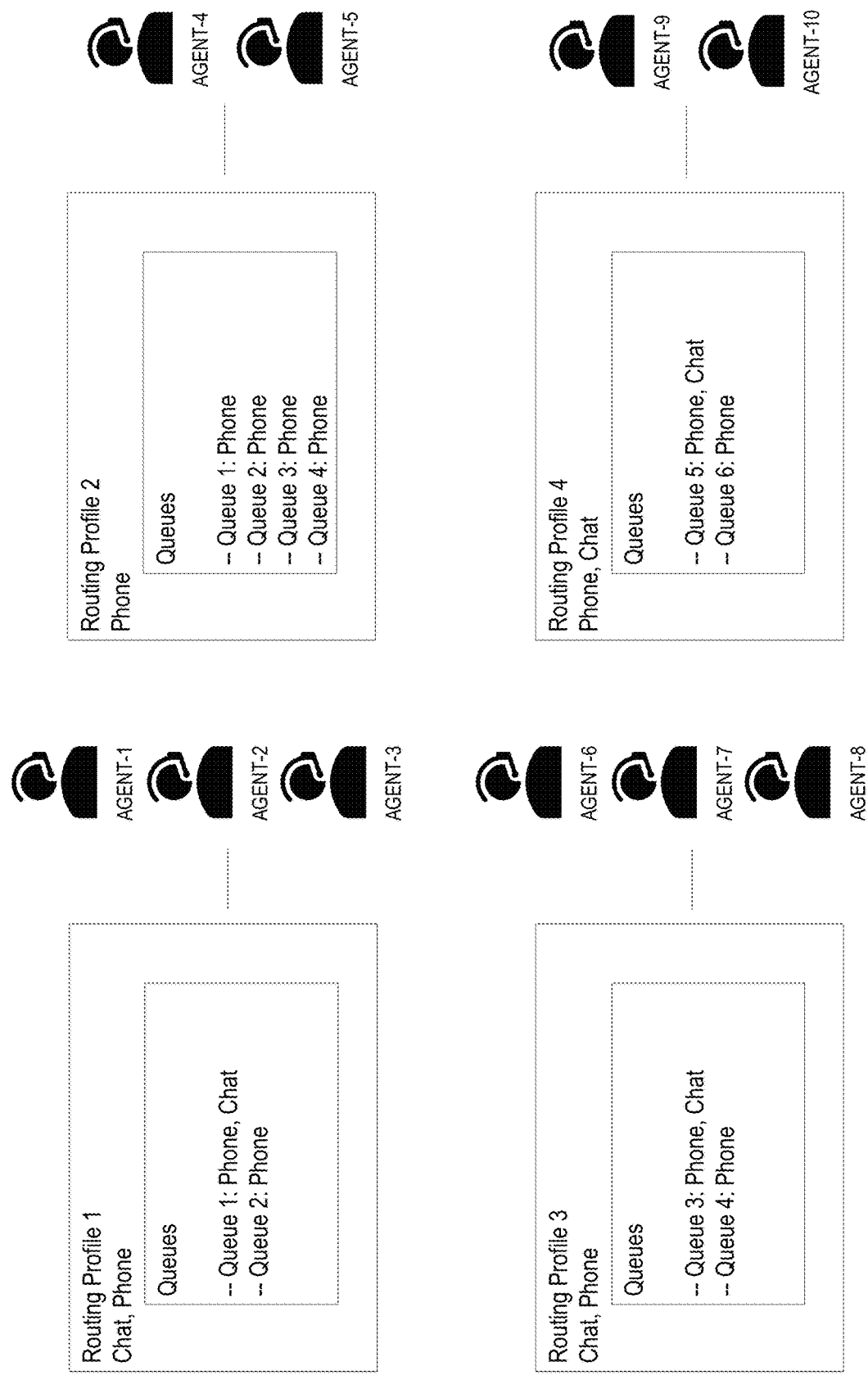
FIG. 2 depicts an example set of routing profiles that a business may configure with a contact center service of a provider network, according to some embodiments.

FIG. 2 depicts an example set of routing profiles that a business may configure with contact center service 104. The business has ten agents Agent-1 through Agent-10 assigned to four routing profiles Routing Profile 1 through Routing Profile 4. The four routing profiles encompass six queues Queue 1 through Queue 6. Queue 1 through Queue 4 are assigned to multiple routing profiles. For example, Queue 3 is assigned to Routing Profile 3 and Routing Profile 2. As a result, a chat contact waiting in Queue 3 can be routed to any of Agent 6, Agent 7, or Agent 8 and a phone contact waiting in Queue 3 can be routine to any of Agent 4, Agent 5, Agent 6, Agent 7, and Agent 8.

Contact 102 may initiate a contact inquiry with a business via phone/voice channel 106-1. For example, contact 102 may initiate a contact inquiry by dialing a toll-free number of a direct-in-dial number of the business. Alternatively, contact 102 may receive an outgoing call (e.g., a call back from agent 126). In either case, contact 102 may initially interface with an interactive voice response (IVR) or automated voice response (AVR) system of contact center service 104 via phone/voice channel 106-1. The IVR/AVR system may prompt contact 102 to answer preliminary questions such as the contact's name, account number, the nature of the contact inquiry, etc. At some point, the IVR/AVR system may determine that the contact inquiry is best handled by a human agent. Alternatively, contact 102 may expressly request IVR/AVR system via phone/voice channel 106-1 that the contact inquiry be serviced by a human agent. In yet another scenario, contact 102 may not interface with an IVR/AVR system. Instead, the contact 102 may initially interface with a human agent. The human agent may inform contact 102 that all agents or all of the agents capable of handling contact 102's contact inquiry are currently busy and that contact 102 will need to be put on hold until a more appropriate agent is available. In any case, contact center service 104 may place contact 102 in a queue (e.g., queue 114) if there are no agents currently available to service the contact inquiry. Just before, contemporaneous with, or just after placing contact 120 in queue 114, contact center service 102 may employ techniques disclosed herein to predict an answer time for contact 102 in queue 114. The predicted answer time may be provided to contact 102 via phone/voice channel 106-1. For example, an automated voice response system of contact center service 104 may aurally communicate the answer time to contact 102 via phone/voice channel 106-1.

In some variations, contact 102 can request an IVR/AVR system of service 104 to provide an updated answer time prediction. For example, contact 102 may receive an initial answer time prediction just before, just after, or contemporaneous with service 104 adding contact 102 to a queue. After some time waiting in the queue, contact 102 may request an updated answer time prediction from the IVR/AVR system of service 104. For example, contact 102 may speak a command into a microphone of or connected to a personal electronic device (e.g., a mobile phone, a smart assistant device, or other smart device) such as "wait time," "estimated wait time," "how long is the wait now," or like inquiry. The IVR/AVR system of service 104 may receive this spoken communication via phone/voice channel 106-1 (e.g., as digital audio signal data) and interpret/process the communication as a request for an updated answer time prediction (e.g., using speech-to-text machine translation). Service 104 may then determine and provide the updated answer time prediction to contact 102 via phone/voice channel 106-1 (e.g., by aurally communicating the answer time to contact 102 via phone channel 106-1.) For example, contact 102 might hear via an electronic speaker of the personal electronic device the updated answer time prediction as "Your estimated wait time is now 5 minutes," "You have 5 minutes to go," or the like. While the example commands and responses are provided in the English language, the user may be given the option to choose the spoken language with which to issue commands to and receive responses from the IVR/AVR system. In some variations, the IVR/AVR system may be able to automatically detect the spoken language based on one or more initial utterances by the contact.

Contact 102 may initiate a contact inquiry with the business via chat channel 106-2. For example, contact 102 may establish a chat session with contact center service 104 using a suitable client application such as a web browser application, a web application, an e-mail application, a chat application, a video conferencing application, a text messaging application, a mobile application, or the like. Like with phone/voice channel 106-1, contact 102 may initially interface with an automated chatbot system or the like of contact center service 104. The automated chatbot system may prompt contact 102 to answer preliminary questions regarding the contact inquiry such as the contact's name, account number, the nature of the contact inquiry, etc. At some point, the automated chatbot system may determine that the contact inquiry is best handled by a human agent. Alternatively, contact 102 may expressly request the chatbot system via chat channel 106-2 that the contact inquiry be serviced by a human agent. In any case, contact center service 104 may place contact 102 in a queue (e.g., queue 114) if there are no agents currently available to service the contact inquiry. Just before, contemporaneous with, or just after placing contact 102 in queue 114, contact center service 104 may employ techniques disclosed herein to predict an answer time for contact 102 in queue 114. The predicted answer time may be provided to contact 102 via chat channel 106-2. For example, an automated chatbot system of contact center service 104 may cause a graphical user interface at contact 102's electronic device to display the answer time prediction.

An answer time prediction can be presented to contact 102 via phone/voice channel 106-1 or chat channel 106-2 in a variety of different manners. For example, an answer time prediction can be a duration from a current time. For example, the answer time prediction may be communicated to contact 102 as "Your estimated wait time is 25 minutes." An answer time prediction can be communicated as a range such as "Your estimated wait time is between 20 to 25 minutes." An answer time can be communicated as a wall clock time such as "We estimate that an agent will be available to handle your inquiry at 4:55 pm" or in a range form such as "We estimate that an agent will be available to handle your inquiry between 4:50 μm and 5:00 pm." Further, while an answer time prediction can be provided in a graphical user interface in a text form, an answer time prediction can additionally or alternatively be provided as a graphic or an animation. For example, an answer time prediction may be presented in a graphical user interface as a clock face, as a countdown timer, as a progress bar, as by other suitable graphical or animation that conveys the answer time prediction.

While the type of contact channels 106 supported by service 104 may include just phone/voice channels (e.g., 106-1), just chat channels (e.g., 106-2), or both phone and chat channels, the type of contact channels supported by service 104 can include other types of contact communications channels by which an answer time prediction can be provided by service 104. For example, in addition to or instead of supporting phone channels or chat channels, service 104 may also support asynchronous messaging channels (e.g., 106-3) such as electronic mail channels (email channels) and text messaging channels (SMS channels). For example, contact 102 may send an electronic message (e.g., an e-mail message or a text message) with a contact inquiry that is received via service 104 by a human agent or an automated agent. The agent may conduct a preliminary analysis of the electronic message to determine how the electronic message should be routed. For example, if the e-mail contains a technical support question or a customer-specific support question, then the e-mail may need to be handled by a specific set of qualified agents all of which may be currently busy responding to other contact inquiries. In this case, the email contact inquiry may be added to a queue for the set of qualified agents (e.g., according to a routing profile). The contact 102 may receive in response to sending the electronic message a further electronic message (e.g., via email or text) that provides an answer time prediction. For example, a reply text message with an answer time prediction might convey that the contact's 102 contact inquiry has been received and that a qualified agent will be able to handle the contact inquiry at a particular time that is determined based on the answer time prediction. In some variations, message channel 106-3 is not a separate channel from chat channel 106-2. Instead, chat channel 106-3 supports multiple messaging modes including turn-based chat in a web browser or web browser like-interface or chat via an exchange of emails or text messages.

Another possible type of channel is virtual assistant channel 106-4. An endpoint of virtual assistant channel 106-4 includes an in-home or in-office smart device with speaker and microphone capabilities. The other endpoint is cloud-based virtual assistant service that uses speech recognition and natural language processing technology to provide chatbot functionality. The two endpoints may be connected by one or more data communications networks (e.g., intermediate network(s) 108)). The cloud-based virtual assistant service may be provided by provider network 100, for example. Contact 102 may speak to the smart device issuing audible commands A spoken command may cause contact 102 to receive an initial answer time prediction from the smart device. For example, contact 102 may speak to the device "Hey Assistant, connect me to ACME technical support," or the like. Upon receiving this command via the smart device, the cloud-based virtual assistant service may connect contact 102 with contact center service (e.g., contact center service 104) such that contact 102 can communicate with a live agent (e.g., agent 126) using the smart device. If it is determined by contact center service 104 that all suitable agents are currently busy, then contact 102 may be provided an initial answer time prediction that is aurally output from the virtual assistant smart device. While contact 102 is waiting for an agent to become available, contact 102 may receive updated answer time predictions that are aurally output from the virtual assistant smart device.

Contact center service 104 may support or provide access to a telephony layer of contact center service 104. When contact 102 uses phone/voice channel 106-1 to place or receive a voice call with contact center service 104, the telephony layer of service 104 is responsible for controlling an endpoint that contact 102 calls into or receives a call from through a carrier, across the Public Switched Telephone Network (PSTN) and to or from contact center service 104. The telephony layer represents the audio path established between contact center service 104 and contact 102.

Contact center service 104 may also support or provide access to a connect interface/API ("connect interface layer") of contact center service 104. The connect interface layer may provide an access point (e.g., a Representational State Transfer (REST) access point). Agents using their workstations and other users may use the access point to access components of contact center service 104 such as reporting and metrics, user configuration, call recordings, and administrative user interfaces. The connect interface/API layer may also be responsible for Single Sign-On (SSO) integration for user authentication, integration with third-party Customer Relationship Management (CRM) systems via data streams, a contact-facing chat user interface, web server(s) hosting a chat API, API gateway endpoints for routing contacts to contact center service 104, etc.

Service 104 may also support or provide access to a contact flow/IVR layer of contact center service 104. This layer may serve as a point of entry and first line of communication with contacts. After a contact contacts contact center service 104, a user-configurable contact flow may control an interaction between contact center service 104, the contact, and an agent. A configured contact flow may allow control over various aspects of the interaction including, for example, prompting contacts, collecting, and storing attributes of the interaction in a database, and routing the contact inquiry appropriately.

Service 104 may also support or provide access to a metric and reporting layer of contact center service 104. The metric and reporting layer include components of contact center service 104 responsible for delivering, consuming, monitoring, alerting, or processing real-time and historical metrics for agents, contacts, and contact center service 104. Metrics may be collected and processed by metric and reporting layer for every call or chat session a contact has with contact center service 104. The collected metrics may be stored in a suitable data storage system where the metrics may be further processed (e.g., aggregated) for reporting or other purposes. Metrics collected and processed by metric and reporting layer may be used in making answer time predictions according to techniques herein.

Service 104 is responsible for predicting an answer time for a given queue (e.g., queue 114) and for a given contact inquiry of a contact (e.g., contact 102) that has been or is to be or may be added to the given queue. For example, service 104 may make this determination just before, contemporaneous with, or just after adding contact 120 to queue 114. Service 104 may coordinate execution of prediction function 110 with on-demand execution service 112. Service 104 may make multiple answer time predictions for different contacts, different contact inquiries, and different queues. For each such determination, service 104 may cause a separate instance of prediction function 110 to be executed by on-demand code execution service 112.

On-demand code execution service 112 enables on-demand execution of prediction function 110 and possibly other code. Prediction function 110 can include code that can be executed on demand Prediction function 110 can be maintained within provider network 100 by on-demand code execution service 112. Prediction function 110 can be associated with a Uniform Resource Locator (URL), Uniform Resource Identifier (URI), or other reference, which can be used to invoke prediction function 110. Prediction function 110 can be executed by a compute resource, such as a virtual machine, container, etc., when triggered or invoked. In some embodiments, prediction function 110 can be invoked through an application programming interface (API) call or a specially formatted HyperText Transport Protocol or Secure-HyperText Transport Protocol (HTTP/S) request message. Accordingly, prediction function 110 can be executed on demand using resources maintained by provider network 100. In some embodiments, these resources can be maintained in a "ready" state (e.g., having a pre-initialized runtime environment configured to execute the serverless functions), allowing prediction function 110 to be executed in near real-time.

ML inference service 116 hosts learned queuing model 118. Learned queuing model 112 models the relationships between a set of historical contact queuing contexts and actual observed answer times for those contexts for a set of one or more contact center queues. Learned queuing model 118 is generally representative of each of potentially multiple trained queuing models that may be hosted by inference service 116. Each such trained model may model the relationships between different sets of historical contact queuing contexts and actual observed answer times for those contexts for different sets of one or more contact center queues.

Learned queuing model 118 may be a "learned" machine learning model. A learned machine learning model (or just "learned model") is sometimes referred to as a trained machine learning model (or just "trained model"). A machine learning model refers generally to a computer-implemented mathematical model constructed (learned) by a computer-executed algorithm (a machine learning algorithm) from a set of data (training data) such that a computer-executed algorithm can use the learned model to make predictions or decisions about new data without having to be explicitly programmed to do so. A common type of machine learning is a supervised learning in which a machine learning algorithm (e.g., a classifier or a regression algorithm) constructs (learns) a computer-implemented mathematical model from a set of data that contains inputs and desired outputs (labels). Other types of machine learning include semi-supervised machine learning and unsupervised learning. In some embodiments, learned queuing model 118 is learned through supervised machine learning techniques.

In some embodiments, ML inference service 116 is implemented with a single physical computing device, or, alternatively, multiple physical computing devices that are interconnected using one or more computing networks, where the physical computing device(s) host one or more virtual machine instances. Inference service 116 can handle the acquisition and configuration of compute capacity (for example, containers, instances, etc.) based on demand for the execution of queuing models. Service 116 can then execute queueing models using the compute capacity. Inference service 116 can automatically scale up and down based on the volume of execution requests received from executing instances of prediction function 110 at on-demand code execution service 112, thereby relieving the customer from the burden of having to worry about over-usation (for example, acquiring too little computing resources and suffering performance issues) or under-usation (for example, acquiring more computing resources than necessary to run the machine learning models, and thus overpaying).

In some embodiments, a virtual machine instance is used to execute training queuing model 118. The virtual machine instance includes an operating system (OS), a language runtime, and a ML scoring container. The ML scoring container is a logical unit created within the virtual machine instance using the resources available on that instance and is used to isolate execution of a task from other processes (for example, task executions) occurring in the instance. In some embodiments, the ML scoring container is formed from a container image and a top container layer. The container image includes an image layer. The image layer represents an executable instruction. Some or all the executable instructions together represent an algorithm that defines queuing model 118. Changes made to the ML scoring container (for example, creation of new files, modification of existing files, deletion of files, etc.) are stored in the top container layer. If the ML scoring container is deleted, the top container layer is also deleted. However, the container image that forms a portion of the deleted ML scoring container can remain unchanged. The ML scoring container can be implemented, for example, as a Linux container.

In some embodiments, the ML scoring container includes a runtime, code, and a set of one or more dependencies (for example, supporting software such as libraries) needed by the code. The runtime can be defined by a set of one or more executable instructions that form at least a portion of the container image that is used to form the ML scoring container (for example, the executable instruction(s) in the container image that define the operating system or runtime to run in the container formed from the container image). The code includes a set of one or more executable instructions that form at least a portion of the container image that is used to form the ML scoring container. For example, the code includes the executable instructions in the container image that represent an algorithm that defines queuing model 118, which may reference the set of dependencies. The code can also include model data that represent characteristics of queuing model 118. The runtime is configured to execute the code in response to an instruction to begin execution of queuing model 118. Execution of the code results in the generation of outputs (for example, a predicted answer time).

In some embodiments, inference service 116 uses a container image included in a deployment request (or a container image retrieved from a container data store in response to a received deployment request) to create and initialize a ML scoring container in a virtual machine instance. For example, inference service 116 creates the ML scoring container that includes the container image or a top container layer.

As indicated above, prediction function 110 can submit a deployment request or an execution request to inference service 116 via a frontend of inference service 116. The deployment request causes inference service 116 to deploy a trained queuing model (e.g., model 118) into a virtual machine instance. For example, the deployment request can include an identification of an endpoint (for example, an endpoint name, such as an HTTP/S endpoint name) and an identification of a trained queuing model (for example, a location of one or more model data files stored in a training model data store). Optionally, the deployment request also includes an identification of a container image stored in a container data store.

Upon receiving the deployment request, inference service 116 initializes a ML scoring container in a hosted virtual machine instance. In embodiments in which the deployment request includes an identification of a container image, the inference service 116 forms the ML scoring container from the identified container image. In embodiments in which the deployment request does not include an identification of a container image, inference service 116 forms the ML scoring container from a container image stored in a container data store that is appropriate for executing the identified queuing model. For example, an appropriate container image can be a container image that includes executable instructions that represent an algorithm that defines queuing model 118.

In some embodiments, inference service 116 further forms the ML scoring container by retrieving model data corresponding to the identified trained queuing model. For example, the deployment request can identify a location of a model data file stored in a training model data store. In embodiments in which a single model data file is identified in the deployment request, inference service 116 retrieves the identified model data file from the training model data store and inserts the model data file into a ML scoring container, which forms a portion of the code. In some embodiments, the model data file is archived or compressed (for example, formed from a package of individual files). Thus, inference service 116 unarchives or decompresses the model data file to obtain multiple individual files and inserts the individual files into the ML scoring container. In some embodiments, inference service 116 stores the model data file in the same location as the location in which the model data file was stored in the ML training container that generated the model data file. For example, the model data file initially was stored in the top container layer of the ML training container at a certain offset, and inference service 116 then stores the model data file in the top container layer of the ML scoring container at the same offset.

In some embodiments, inference service 116 associates the initialized ML scoring container with the endpoint identified in the deployment request. For example, the initialized ML scoring container can be associated with a network address. The inference service 116 can map the network address to the identified endpoint, and inference service 116 or another system (for example, a routing system, not shown) can store the mapping. Thus, prediction function 110 can refer to a trained queuing model stored in a ML scoring container using the endpoint. This allows for the network address of an ML scoring container to change without causing the way in which prediction function 110 refers to a trained queuing model to need to change.

Once a ML scoring container is initialized, the ML scoring container is ready to execute a trained queuing model. In some embodiments, prediction function 110 transmits an execution request to inference service 116 via a frontend of inference service 116, where the execution request identifies an endpoint and includes an input to a trained queuing model (for example, a set of input data). The inference service 116 or another system (for example, a routing system, not shown) can obtain the execution request, identify the ML scoring container corresponding to the identified endpoint, and route the input to the identified ML scoring container.

In some embodiments, a virtual machine instance executes the code stored in an identified ML scoring container in response to inference service 116 receiving the execution request. In particular, execution of the code causes the executable instructions in the code corresponding to the algorithm to read the model data file stored in the ML scoring container, use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied by the virtual machine instance as the input parameters. With characteristics of the trained queuing model and the input parameters provided, execution of the executable instructions by the virtual machine instance can be completed, resulting in an output (e.g., an answer time prediction).

In some embodiments, the virtual machine instance stores the answer time prediction output in a model prediction data store. Alternatively, or in addition, the virtual machine instance transmits the output to the instance of prediction function 110 that submitted the execution request.

Figure 3:
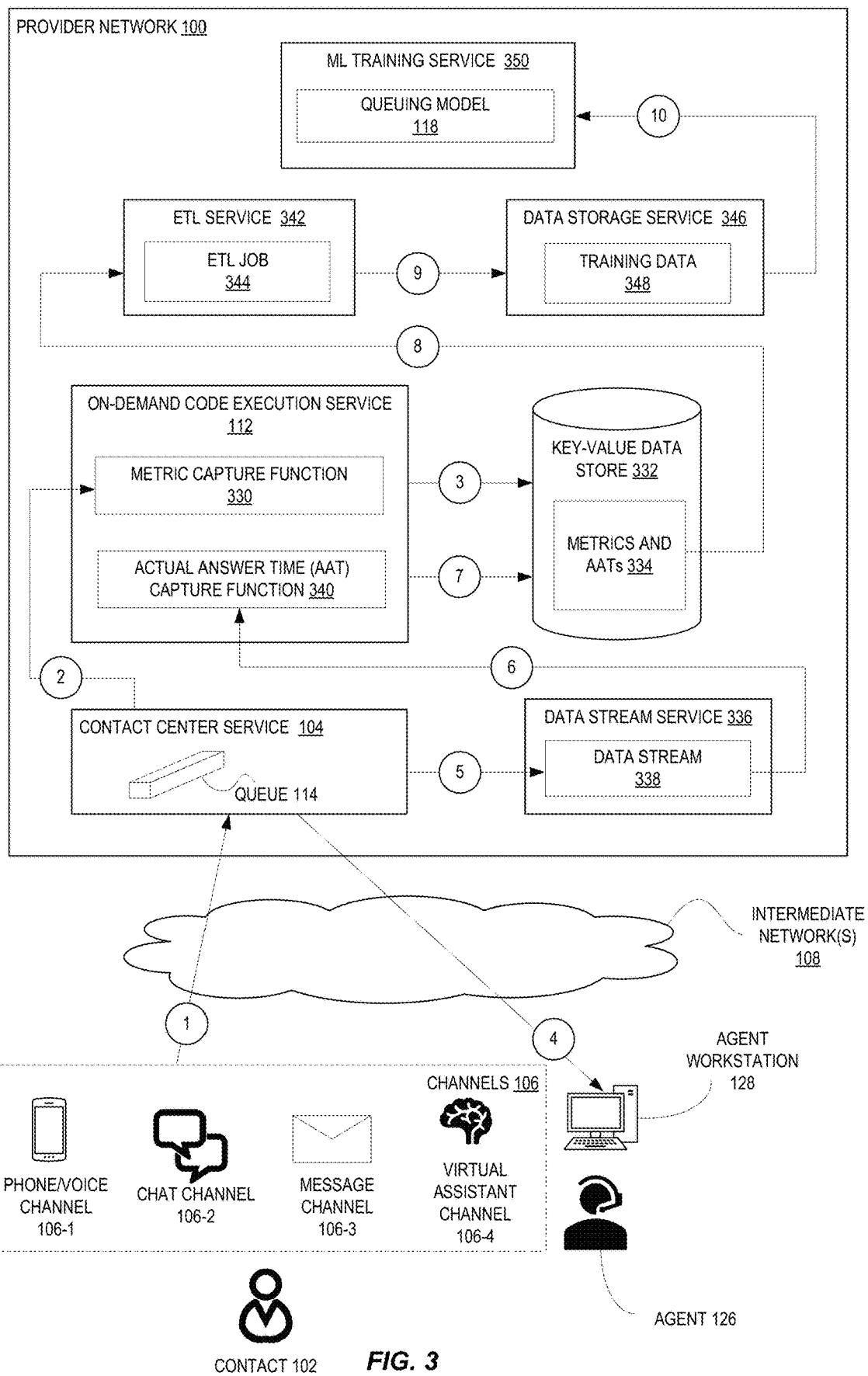
FIG. 3 is a diagram illustrating an environment for training a queuing model for answer time prediction in a contact center service of a provider network, according to some embodiments.

FIG. 3 illustrates a process for training a queuing model for answer time prediction in a contact center service of a provider network. At a high-level, the process has ten steps labeled within circles as 1, 2, 3, 4, 5, 6, 7, 8, 9, and 10 in FIG. 3.

In summary, the process proceeds at Step 1 by contact 102 initiating a contact inquiry with contact center service 104 in provider network 100 via a contact inquiry communications channel 106 such as phone/voice communications channel 106-1 or chat communications channel 106-2 and over intermediate data communications network(s) 108. The contact inquiry initiation is received at contact center service 104 of provider network 100. At some point, it may be determined by contact center service 104 that contact 102 should be placed in queue 114 while waiting for agent 126 to become available to handle the contact inquiry.

At Step 2, contact center service 104 invokes metric capture function 330 with on-demand code execution service 112. When executed, metric capture function 330 collects a set of queuing metrics reflecting the current contact queuing context for contact 102, the contact inquiry, and queue 114.

At Step 3, the collected set of queuing metrics are caused to be stored by metric capture function 330 as part of metrics and actual answer time data 334 stored in key-value data store 332.

After contact 102 has waited in queue 114 for some time until agent 126 is available, then, at Step 4, the contact inquiry is routed to agent workstation 128 by contact center service 104 and agent 126 begins to service (answers) the contact inquiry.

At Step 5, an actual answer time event message is published by contact center service 104 to data stream 338 of data stream service 336. The actual answer time event message includes the actual answer time for contact 102's contact inquiry.

As a consumer of data from data stream 338, at Step 6, actual answer time capture function 340 is executed at on-demand code execution service 112 and receives the actual answer time event message from data stream 338.

Then, at Step 7, actual answer time capture function 340 stores the actual answer time as part of metrics and actual answer times data 334 in association with the collected set of queuing metrics stored as part of metrics and actual answer times data 334 at Step 3. The combination of a set of queuing metrics along with the actual answer time represents a contact queuing context for queue 114. Steps 1 through 7 may be repeated for multiple (possibly different) contacts and multiple (possible different) contact inquires that use queue 114 over a period of time.

At Step 8, an extract-transform-load (ETL) job 344 at ETL service 342 extracts a set of historical contact queuing contexts for queue 114 from metrics and AATs (Actual Answer Times) data 334. Each historical contact queuing context for queue 114 that is extracted comprises the corresponding set of queuing metrics and the associated actual answer time.

At Step 9, ETL job 334 transforms the extracted set of historical contact queuing contexts for queue 114 into training data 348 and loads training data 348 into data storage service 346.

At Step 10, ML training service 350 trains (learns) queuing model 118 based on training data 348. Once trained (learned), queuing model 118 may be used for inference as described above with respect to FIG. 1.

Data stream service 336 is a service of provider network 110 that enables data to be streamed to and from data stream service 336 for processing. From the perspective of data stream service 336, a "stream producer" or just "producer" is a source that puts data into a data stream. Contact center service 104 acts as a producer for data stream 338 in some embodiments. A data stream is a resource at data stream service 336 that provides for the transportation of data from a set of one or more producers that put data into the data stream to a set of one or more "stream consumers" or just "consumers" that consume data from the data stream for the purpose of processing the consumed data. In some embodiments, AAT capture function 340 is a consumer of data from data stream 338. At any given time, data stream service 336 may provide for the transportation of data between producers and consumers through many data streams of which data stream 338 is just one example.

In some embodiments, contact center service 104 sends a stream of actual answer time event messages as agents (e.g., agent 126) answer (begin servicing) contact inquiries from queue 114. Each actual answer time event message may identify queue 114 (e.g., by the name or identifier of queue 114) and an actual answer time for a contact inquiry. As mentioned, an actual answer time for queue 114 may encompass the time between when a contact (e.g., contact 102) is placed in queue 114 and when an agent (e.g., agent 126) answers the contact's contact inquiry. This time corresponds to the contact's wait time in queue 114. An agent may be considered to have answered a contact inquiry when contact center service 104 routes the contact inquiry to an agent's workstation (e.g., workstation 128) such that an agent (e.g., agent 126) at the workstation can begin communicating with the contact (e.g., contact 102) via a contact communications channel (e.g., phone/voice channel 106-1 or chat channel 106-2). However, the particular events that are considered to mark the beginning and the end of the actual answer time may vary and no particular events are required so long as the actual answer time reflects, corresponds to, or represents the amount of time that the contact is waiting in queue 114 before the contact's contact inquiry is answered by an agent. For example, the actual answer time may be measured based on when the contact is provided an answer time prediction in a contact communications channel 106 by contact center service 104 and when the contact is connected via a communications channel 106 by contact center service 104 to an agent that is ready to begin servicing the contact's inquiry.

Metric capture function 330 can include code that be executed on-demand by on-demand code execution service 112. Metric capture function 330 can be maintained within provider network 100 by on-demand code execution service 112. Metric capture function 330 can be associated with a Uniform Resource Locator (URL), Uniform Resource Identifier (URI), or other reference, which can be used to invoke metric capture function 330. Metric capture function 330 can be executed by a compute resource, such as a virtual machine, container, etc., when triggered or invoked. In some embodiments, metric capture function 330 can be invoked through an application programming interface (API) call or a specially formatted HyperText Transport Protocol or Secure-HyperText Transport Protocol (HTTP/S) request message. Accordingly, metric capture function 330 can be executed on demand using resources maintained by provider network 100. In some embodiments, these resources can be maintained in a "ready" state (e.g., having a pre-initialized runtime environment configured to execute the serverless functions), allowing metric capture function 330 to be executed in near real-time.

Actual Answer Time (AAT) capture function 340 can include code that can be executed on-demand by on-demand code execution service 112. AAT capture function 340 can be maintained within provider network 100 by on-demand code execution service 112. AAT capture function 340 can be associated with a Uniform Resource Locator (URL), Uniform Resource Identifier (URI), or other reference, which can be used to invoke AAT capture function 340. AAT capture function 340 can be executed by a compute resource, such as a virtual machine, container, etc., when triggered or invoked. In some embodiments, AAT capture function 340 can be invoked through an application programming interface (API) call or a specially formatted HyperText Transport Protocol or Secure-HyperText Transport Protocol (HTTP/S) request message. Accordingly, AAT capture function 340 can be executed on demand using resources maintained by provider network 100. In some embodiments, these resources can be maintained in a "ready" state (e.g., having a pre-initialized runtime environment configured to execute the serverless functions), allowing AAT capture function 340 to be executed in near real-time.

Figure 4:
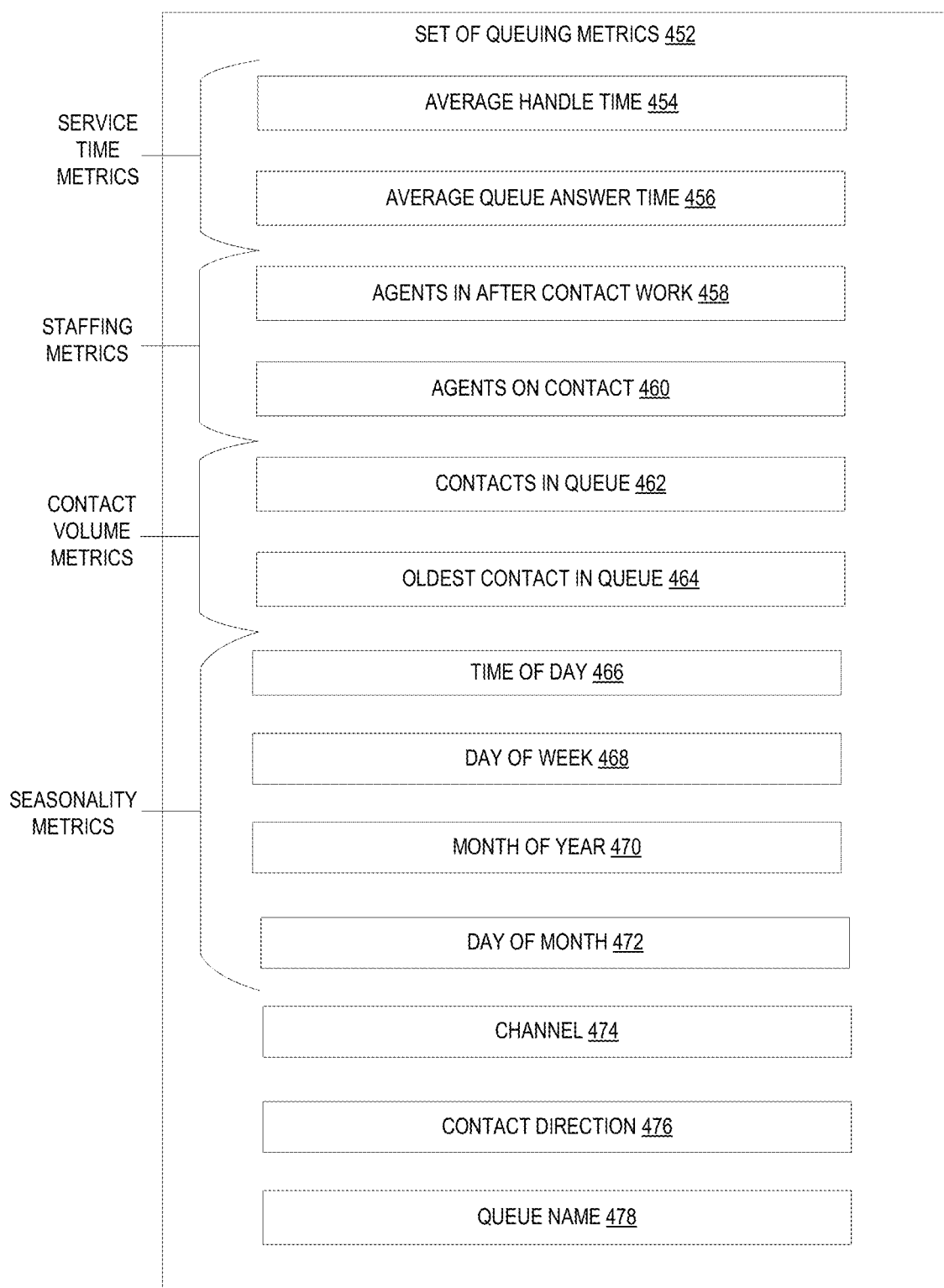
FIG. 4 illustrates a set of queuing metrics, according to some embodiments.

Metrics and Actual Answer Times (AATs) 334 include sets of queuing metrics collected from contact center service 104 by metric capture function 330 for queues, and for each set of queuing metrics, an actual answer time. Each set of queuing metrics represents a contact center queuing context for a respective contact, a respective contact inquiry, and a respective queue. FIG. 4 illustrates set of queuing metrics 452 that may be collected by metric capture function 330 for a contact center queuing context. Set 452 may be collected by metric capture function 330 just before, just after, or contemporaneous with contact center service 104 adding the respective contact to the respective queue. More generally, set 452 may be collected any time an answer time prediction (an initial answer time prediction or an updated answer time prediction) is desired for the respective queue.

Set 452 reflects the current or recent state of the respective queue at the time set 452 is captured by metric capture function 330. In some embodiments, all the metrics of set 452 are collected by metric capture function 330 for a contact center queuing context, a subset of these metrics are collected, or a superset thereof is collected.

Average handle time 454 encompass the average time that a contact in the respective queue was connected by contact center service 104 with an agent, over a number of recent contact inquiries serviced from the respective queue. It includes conversation time, hold time, and after contact work time (e.g., contact inquiry wrap up tasks performed by the agent after communication between the agent and the contact has finished). The number of recent contact inquiries over which average handle time 454 is computed can be selected by metric capture function 330 based on the volume of contact inquiries recently serviced, with shorter past time intervals used for higher contact inquiry volume and longer past time intervals used for lower contact inquiry volume. For example, the average may be computed over the past fifteen or thirty minutes for high contact inquiry volume and over the past hour or hours for lower contact inquiry volume.

Average queue answer time 456 encompasses the average time that a contact waited in the respective queue before being connected by contact center service 104 with an agent, over a number of recent contact inquiries serviced from the respective queue. The number of recent contact inquiries over which average queue answer time 456 is computed can be selected by metric capture function 330 based on the volume of contact inquiries recently serviced, with shorter past time intervals used for higher contact inquiry volume and longer past time intervals used for lower contact inquiry volume. For example, the average may be computed over the past fifteen or thirty minutes for high contact inquiry volume and over the past hour or hours for lower contact inquiry volume.

Agents in after contact work 458 encompasses a count of contacts serviced from the respective queue that are in an after-contact work state (sometimes called "after call work," "wrap up time," or "post call processing"). After a conversation between an agent and a contact ends, the contact may be moved by contact center service 104 into an after contact work state during which the agent performs wrap up tasks such as making notes or reminders in contact inquiry database of contact center service 104 for future reference by the agent or other agents. The time needed for after contact work may vary based on various factors such as the industry, the inquiry type, the customer's internal processes, and agent behavior. For example, online retail and sales often have short after contact work times while information technology, insurance, and baking tend to have longer after contact work times because of the increased issue complexity. Routine transactional contact inquiries tend to have shorter after contact work times when compared to unique complex inquires. A customer may add to the after-contact work by requiring agents to add contact information into a customer relationship management (CRM) system. Some agents may prolong wrap time to avoid handling another contact, or some agents may simply be slower at typing than others.

Agents on contact 460 encompasses a count of contacts from the respective queue that are connected, on hold, or in after contact work with an agent. In some embodiments, agents on contact 460 includes agents who are calling outbound via a phone communications channel to a contact from the respective queue. For example, an answer time prediction provided to a contact added to the respective queue may be for when an agent is estimated to call the contact back to discuss the contact inquiry. An outbound call can be made according to a predictive approach, a progressive approach, or a preview approach.

With a predictive approach, contact center service 104 automatically dials a list of contact phone numbers and automatically connects answered calls to an agent. With a predictive approach, if a contact answers an outbound call, the contact may be placed in a queue until an agent is available. The answering contact may be provided an initial answer time prediction after being put on hold and possibly updated answer time predictions as the contact continues to hold on the call until an agent is available. The predictive approach used by contact center service 104 may use a statistical algorithm to reduce the time agents spend waiting between conversations, while reducing the occurrence of a contact answering when no agent is available to handle the contact inquiry.

The progressive approach is like the predictive approach but with less aggressive assumptions about the number of outbound calls that will fail to connect with a contact. For example, a progressive approach used by contact center service 104 may dial a contact only when there is an agent available to handle the contact inquiry. An answering contact to an outbound call made according to the progressive approach may also be provided an initial answer time and updated answer time(s) while on hold.

In some variations, a contact answering an outbound call made according to the predictive or progressive approach is given the option to receive a call back when an agent becomes available to speak with the contact. In this case, the answering contact may receive an initial answer time prediction and given the option (e.g., through an IVR/AVR system) to stay on hold or receive a call back. If the contact chooses to receive a call back, the contact may hang up and wait for an agent to call the contact back. In some variations, while waiting for the agent to call the contact back, the contact receives an updated answer time prediction through a web page or an electronic message (e.g., via email or SMS message) sent to the contact via a different contact communications channel. The updated answer time prediction conveyed in the web page, or the electronic message reflects when an agent is expected to call the contact back per the previously chosen option. In some variations, an updated answer time prediction is provided to the contact (e.g., in a web page or in an electronic message) automatically without the contact having to expressly request an updated answer time prediction.

With a preview approach, a particular agent is designated to speak with a dialed contact should the dialed contact answer the outbound call. If the dialed contact answers the call, then contact may be immediately routed to the particular agent without having to wait in a queue. In this case, the contact may not be provided an initial answer time prediction before speaking with the particular agent. However, the contact may later be provided an initial answer time prediction if, for example, the particular agent transfers or routes the contact to another agent with special expertise to handle the contact's inquiry and that agent or all agents with that expertise are currently busy. In that case, the contact may be added to a queue for the agent or agents and the initial answer time prediction determined for the queuing context and provided to the contact.

Contacts in queue 462 encompass a count of contacts added to the respective queue during a past period of time. The length of the period of time may be selected based on the volume contacts serviced from the respective queue. In particular, the length of the period of time can be selected by metric capture function 330 based on the volume of contact inquiries recently serviced from the respective queue, with shorter past time intervals used for higher contact inquiry volume and longer past time intervals used for lower contact inquiry volume. For example, the count may be over the past fifteen or thirty minutes for high contact inquiry volume and over the past hour or hours for lower contact inquiry volume.

Oldest contact in queue 464 encompasses the length of time that the contact that has been waiting in the respective queue the longest has been waiting in the respective queue.

Time of day 466 encompasses the hour of the day. In some embodiments, for a high-volume queue, the day is divided into shorter intervals (e.g., thirty- or fifteen-minute intervals) and time of day 466 indicates one of the shorter intervals. For example, for thirty-minute intervals, the day is divided into forty-eight (48) time intervals.

Day of week 468 encompass the day of the week such as, for example, by an integer value ranging from 0 to 6 or 1 to 7.

Month of year 470 encompass the month of the year such as, for example, by an integer value ranging from 0 to 11 or 1 to 12.

Day of month 472 encompass the day of the month such as, for example, by an integer value ranging from 0 to 30 or 1 to 31.

Channel 474 encompasses a count of contacts in the respective queue that were (e.g., when added to the queue) or are currently using a respective contact communications channel (e.g., phone or chat). There may be a channel 472 metric for each possible type of contact communications channel (e.g., phone, chat, email, etc.).

Contact direction 476 may be a per-context queuing context metric. In particular, for a given historical contact queuing context or a target contact queuing context, contact direction 476 encompasses whether corresponding queueing context is inbound/outbound or outbound, and if outbound, the dialing approach used (e.g., progressive or predictive). An inbound/outbound contact direction 476 encompasses an inbound phone channel where contact 102 dials a phone number hosted by contact center service 104 or a non-phone channel such as chat channel or a messaging channel (e.g., an email channel or an SMS channel). An outbound contact direction 476 encompasses an outbound phone channel where contact center service 104 automatically dials contact 102 using a progressive or predictive dialing approach.

Queue name 478 encompasses a unique name or identifier of the respective queue.

After a delayed processing timing has been met, ETL job 344 at ETL service 342 extracts a set of historical contact queuing contexts for queue 114 from metrics and AATs data 334. Each historical contact queuing context for queue 114 that is extracted comprises the corresponding set of queuing metrics and the associated actual answer time. ETL job 334 transforms the extracted set of historical contact queuing contexts for the queue into training data 348 and loads training data 348 into data storage service 346. As part of the transformation, ETL job 344 may scale and encoded metrics and AATs data 334 for machine learning. ML training service 350 trains (learns) queuing model 118 based on training data 348. Once trained (learned), queuing model 118 may be used for inference as described above with respect to FIG. 1.

ML training service 350 is configured periodically to relearn queuing model 118 on a retraining schedule. For example, ML training service 350 may relearn queuing model 118 every twenty-four hours, every forty-eight hours, once a week, once a month, or on another predetermined relearning frequency. Each time ML training service 350 relearns queuing model 118, it may train queuing model 118 based on the latest training data 348 for training queuing model 118 at data storage service 346. ETL job 334 may be run at the same relearning frequency to generate the latest training data 348. For example, if the retraining frequency is once a day, then, at the end of the day, ETL job 344 may run to generate the latest training data 348 for training queuing model 118. Then, ML training service 350 may relearn queuing model 118 based on the just generated latest training data 348 available at data storage service 346.

The set of training data 348 from which queuing model 118 is learned by ML training service 350 can span a past period of time referred to herein as the training window. For example, the training window may be a number of days (e.g., one, two, three, or seven days). When a time arrives to relearn queuing model 118, ML training service 350 may use a training window size amount of training data 348. For example, assume the training window size is seven days. Then, at the end of day of Day 7, ETL job 344 may run to generate training data for Day 7 based in metrics and AATs data 334 collected for Day 7 to be added to the training data for Days 1 through 6 that already exist as part of training data 348 at data storage service 346. Then, ML training service 350 may relearn (e.g., in a batch or online learning fashion) queuing model 118 based on the training data available at data storage service 346 for Days 1 through 7. At the end of Day 8, ETL job 344 may run again to generate training data for Day 8 to be added to the training data for Days 2 through 7 that already exist as part of training data 348 at data storage service 346. Then, ML training service 350 may relearn queuing model 118 based on the training data available at data storage service 346 for Days 2 through 8.

In some embodiments, a container image can include one or more layers, where each layer represents an executable instruction. Some or all the executable instructions together represent an algorithm that defines a queuing model. The executable instructions (for example, the algorithm) can be written in any programming language (for example, Python, Ruby, C++, Java, etc.). In some embodiments, the algorithm is pre-generated and obtained by ML training service 350 from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, an algorithm written in any programming language may be used. The ML training service 350 then packages the algorithm into a container (optionally with other code, such as a "base" ML algorithm supplemented with user-provided code) that is eventually loaded into a virtual machine instance for training a queuing model. For example, algorithm/code may be containerized on its own or used together with an existing container having a machine learning framework, for example. A container image can be stored in a container data store in provider network 100, and this container image may have been previously created/uploaded to the container data store. The ML training service 350 can retrieve the container image from the indicated location and create a container using the retrieved container image. The container is then loaded into a virtual machine instance for training a queuing model.

ML training service 350 train a queuing model in one or more pre-established virtual machine instances in some embodiments. In particular, ML training service 350 includes a single physical computing device or multiple physical computing devices that are interconnected using one or more computing networks (not shown), where the physical computing device(s) host one or more virtual machine instances. ML training service 350 can handle the acquisition and configuration of compute capacity (for example, containers, instances, etc., which are described in greater detail below) based on the information describing the computing machine on which to train a queuing model provided by a device. ML training service 350 can then train queuing models using the compute capacity, as is described in greater detail below. ML training service 350 can automatically scale up and down based on the volume of training tasks being performed, thereby relieving the customer from the burden of having to worry about over-usation (for example, acquiring too little computing resources and suffering performance issues) or under-usation (for example, acquiring more computing resources than necessary to train the customer's queuing model models, and thus overpaying).

In some embodiments, the virtual machine instances are used to execute tasks. For example, such tasks can include training a queuing model. Each virtual machine instance may include an operating system (OS), a language runtime, and a training container. Generally, the ML training container is a logical unit created within a virtual machine instance using the resources available on that instance and can be used to isolate execution of a task from other processes (for example, task executions) occurring in the instance. In some embodiments, the ML training container is formed from a container image and a top container layer. The container image may further include one or more image layers, where each image layer represents an executable instruction. Some or all the executable instructions together represent an algorithm that defines a queuing model. Changes made to the ML training container (for example, creation of new files, modification of existing files, deletion of files, etc.) are stored in the top container layer. If the ML training container is deleted, the top container layer is also deleted. However, the container image that forms a portion of the deleted ML training container can remain unchanged.

The ML training container can be implemented, for example, as a Linux container (LXC), a Docker container, or the like.

The ML training container may include a runtime, code, and dependencies needed by the code. The runtime can be defined by one or more executable instructions that form at least a portion of a container image that is used to form the ML training container (for example, the executable instruction(s) in the container image that define the operating system or runtime to run in the container formed from the container image). The code includes one or more executable instructions that form at least a portion of a container image that is used to form the ML training container. For example, the code includes the executable instructions in the container image that represent an algorithm that defines a machine learning model, which may reference (or use) code or libraries from dependencies. The runtime is configured to execute the code in response to an instruction to begin queuing model training. Execution of the code results in the generation of model data.

In some embodiments, the code includes executable instructions that represent an algorithm that defines a queuing model. In some embodiments, the virtual machine instance executes the code and trains the queuing model. In some embodiments, the virtual machine instance executes the code, selecting a queuing model to train. For example, the virtual machine instance can identify a type of training data 348 and select a queuing model to train (for example, execute the executable instructions that represent an algorithm that defines the selected queuing model) that corresponds with the identified type of training data 348.

Prior to beginning the training process, in some embodiments, ML training service 350 retrieves training data 348 from data storage service 346. In some embodiments, ML training service 350 does not retrieve training data 348 prior to beginning the training process. Rather, ML training service 350 streams training data 348 from data storage service 346 during the training process. For example, ML training service 350 can initially retrieve a portion of training data 348 and provide the retrieved portion to the virtual machine instance training the queuing model. Once the virtual machine instance has applied and used the retrieved portion or once the virtual machine instance is about to use all the retrieved portion (for example, a buffer storing the retrieved portion is nearly empty), then ML training service 350 can retrieve a second portion of training data 348 and provide the second retrieved portion to the virtual machine instance, and so on.

To perform the queuing model training, the virtual machine instance executes code stored in the ML training container in some embodiments. For example, the code includes some or all the executable instructions that form the container image of the ML training container initialized therein. Thus, the virtual machine instance executes some or all the executable instructions that form the container image of the ML training container initialized therein to train a queuing model. The virtual machine instance executes some or all the executable instructions according to hyperparameter values. As an illustrative example, the virtual machine instance trains a queuing model by identifying values for certain parameters (for example, coefficients, weights, centroids, etc.). The identified values depend on hyperparameters that define how the training is performed. Thus, the virtual machine instance can execute the executable instructions to initiate a queuing model training process, where the training process is run using the hyperparameters. Execution of the executable instructions can include the virtual machine instance applying training data 348 retrieved by the ML training service 350 as input parameters to some or all the instructions being executed.

In some embodiments, executing the executable instructions causes the virtual machine instance (for example, the ML training container) to generate model data. For example, the ML training container generates model data and stores the model data in a file system of the ML training container. The model data includes characteristics of the queuing model being trained, such as a number of layers in the queuing model, hyperparameters of the queuing model, coefficients of the queuing model, weights of the queuing model, or the like. In particular, the generated model data includes values for the characteristics that define a queuing model being trained. In some embodiments, executing the executable instructions causes a modification to the ML training container such that the model data is written to the top container layer of the ML training container or the container image that forms a portion of the ML training container is modified to include the model data.

In some embodiments, the virtual machine instance (or the ML training service 350 itself) pulls the generated model data from the ML training container and stores the generated model data in a training model data store in an entry associated with the virtual machine instance or the queuing model being trained. In some embodiments, the virtual machine instance generates a single file that includes model data and stores the single file in the training model data store. In some embodiments, the virtual machine instance generates multiple files during the course of training a queuing model, where each file includes model data. In some embodiments, each model data file includes the same or different model data information (for example, one file identifies the structure of an algorithm, another file includes a list of coefficients, etc.). The virtual machine instance can package the multiple files into a single file once training is complete and store the single file in the training model data store. Alternatively, the virtual machine instance stores the multiple files in the training model data store. The virtual machine instance stores the file(s) in the training model data store while the training process is ongoing or after the training process is complete.

In some embodiments, the virtual machine instance regularly stores model data file(s) in the training model data store as the training process is ongoing. Thus, model data file(s) can be stored in the training model data store at different times during the training process. Each set of model data files corresponding to a particular time, or each set of model data files present in the training model data store as of a particular time could be checkpoints that represent different versions of a partially-trained queuing model during different stages of the training process.

While in some embodiments as in many of the examples given herein there is a one-to-one correspondence between a contact center queue and a queueing model, there is a many-to-one correspondence between a queuing model and multiple contact center queues. This is, a queuing model can be trained to predict answer times for multiple queues such as, for example, all the queues assigned to a particular routing profile of a customer. In this case, the queuing model can incorporate metrics and actual answer times collected from the multiple queues and the single queuing model, once learned, can be used to make answer time predictions for any and all of the multiple queues. This might be done, for example, if multiple queues have similar queuing characteristics or all belong to the same routing profile. This also might be done simply to reduce the number of queuing models. For example, a customer may wish to learn and use a single queuing model for all of their queues across all of their routing profiles. Thus, while examples herein feature a one-to-one correspondence between queue and queuing model, the techniques are not so limited as a single queuing model may be used and learned for multiple queues.

In some embodiments, a customer may configure a set of one or more queuing model parameters for a given (selected) queuing model. The set of queuing model parameters govern how the queuing model is learned (trained) by ML training service 350 including which metrics about a set of historical context queueing contexts are used by ML training service 350 when learning the queuing model from the set of historical context queuing contexts and governs which metrics about a target contact queuing context are used by ML inference service 116 when making answer time predictions using the learned queuing model.

Figure 5:
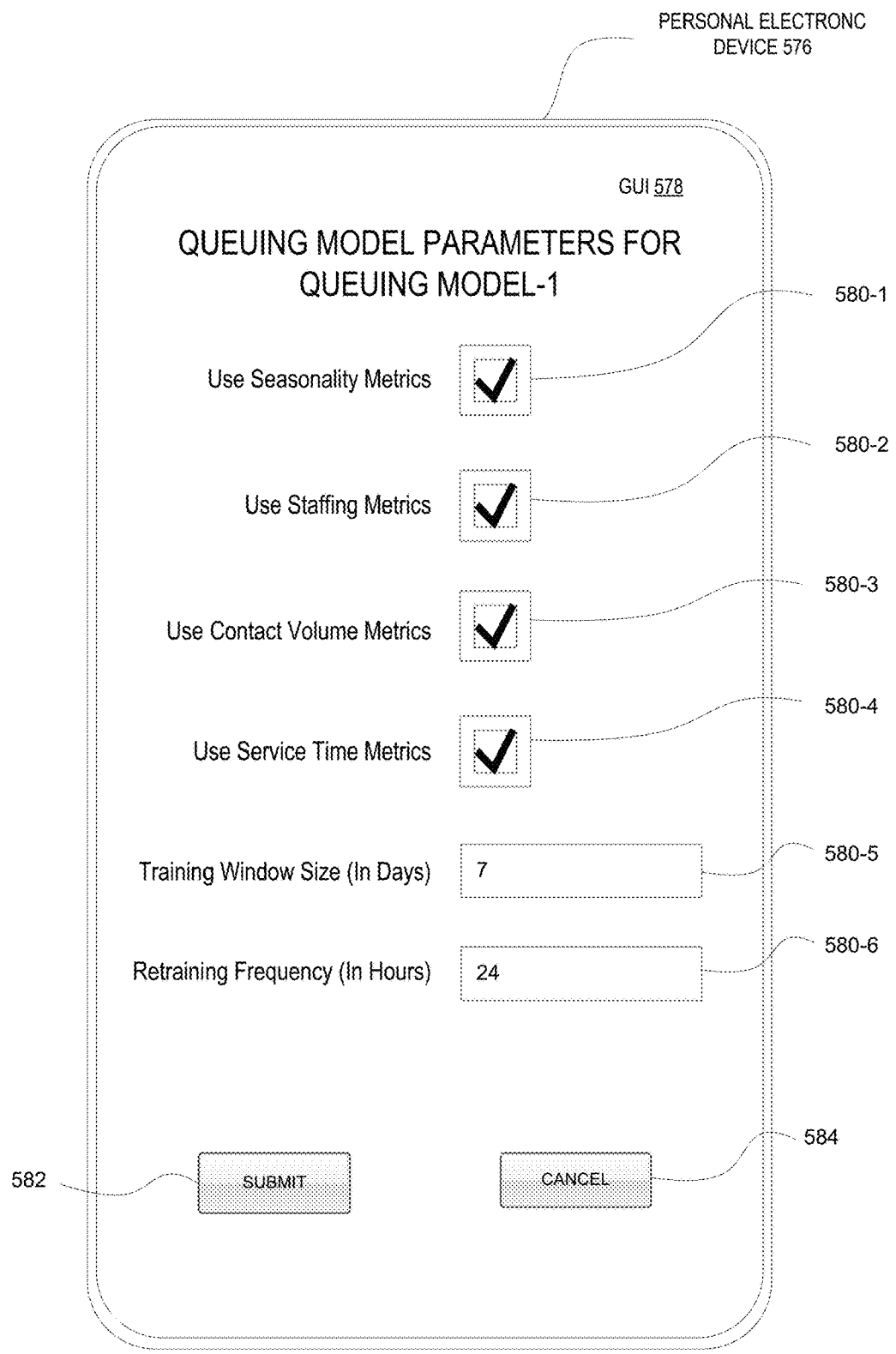
FIG. 5 illustrates a graphical user interface for configuring a set of queuing model parameters for a queuing model, according to some embodiments.

FIG. 5 illustrates a graphical user interface 578 of a personal electronic device 576 (in this example a mobile phone) where a customer user can configure queuing model parameters for a particular queuing model of the customer (e.g., a queuing model selected by the customer using another graphical user interface (not shown)). In this example, the particular queuing model is named "Queuing Model-1." The GUI may be driven by a web service, web application, or the like of contact center service 104 and over intermediate network(s) 108 such as, for example, as part of an administrative web-based graphical user interface that contact center service 104 offers to its customers for configuring routing profiles, queuing model parameters, or the like. In this example, the customer user may have selected the particular queueing model (e.g., Queuing Model-1) to configure from another graphical user interface (not shown) such as one that, for example, lists a set of queuing models that customer is using with contact center service 104.

Graphical user interface controls 580-1 (e.g., a checkbox) is used to configure ML training service 350 to use or not use seasonality metrics when learning the selected queueing model and to configure ML inference service 116 to use or not use seasonality metrics when predicting answer times using the learned queueing model. Seasonality metrics include time of day 466, day of week 468, month of year 470, and day of month 472 metrics among other possible seasonality metrics.

Graphical user interface controls 580-2 is used to configure ML training service 350 to use or not use staffing metrics when learning the selected queuing model and to configure ML inference service 116 to use or not use staffing metrics when predicting answer times using the learned queueing model. Staffing metrics might include, for example, agents in after contact work 458 and agents on contact 460.

Graphical user interface controls 580-3 (e.g., a checkbox) is used to configure ML training service 350 to use or not use contact volume metrics when learning the selected queuing model and to configure ML inference service 116 to use or not use contact volume metrics when predicting answer times using the learned queueing model. Contact volume metrics include, for example, contacts in queue 462 and oldest contact in queue 464 metrics.

Graphical user interface controls 580-4 (e.g., a checkbox) is used to configure ML training service 350 to use or not use service time metrics when learning the selected queuing model and to configure ML inference service 116 to use or not use service time metrics when predicting answer times using the learned queueing model. Service time metrics include average handle time 454 and average queue answer time 456 metrics.

Graphical user interface controls 580-5 (e.g., a text box) is used to configure ML training service 350 with the size of the training window (e.g., in days) to use when learning the selected queuing model. In this example, the value "7" in the text box selects a training window size of seven days. However, the training window could be much larger. For example, a training window size of 365 days or more is possible.

Graphical user interface controls 580-6 (e.g., text box) is used to configure ML training service 350 with the frequency (e.g., in hours) with which the selected queuing model is to be retrained/relearned using the latest (most recent) training window of training data 346 for the selected queuing model. In this example, the value "24" in the text box selects a retraining frequency of twenty-four hours. However, it is also possible to retrain/relearn the queuing model more frequently (e.g., twice a day) or less frequency (e.g., once a week or once a month).

Activating the "SUBMIT" button 582 causes the selected queuing model parameters 580 to be applied by ML training service 350 and ML inference service 116 to the selected queuing model at and after the next retraining of the queueing model by ML training service 350. Activating the "CANCEL" button 584 will retain the queuing model parameters that are currently in use by ML training service 350 for the selected queuing model.

It also possible to allow the customer to select individual metrics for inclusion. For example, some or all of set of queuing metrics 452 may be individually selectable as queuing model parameters in a graphical user interface. This would allow, for example, for a customer to configure a queuing model for learning by ML training service 350 based on using time of day metrics 466 but not day of week 468 or month of year 480 metrics. In this example, at inference time, the learned queuing model would use time of day 466 features but not day of week 468 or month of year 480 features.

In some variations, the set of configurable queuing parameters specifies what type or types of channel 474 metrics (e.g., phone, chat, message, email, SMS) to use or not use when learning the queuing model and to configure ML inference service 116 to use or not use that type or those types of channel 474 metrics when predicting answer times using the learned queueing model. For example, the set of configurable queuing parameters may specify to use all types of channel 474 metrics, or just phone channel 474 metrics, or just phone and chat channel 477 metrics.

In some variations, the set of configurable parameters specifies what type or types of contact directions 476 to use or not use when learning the queuing model and to configure ML inference service 116 to use or not use that type or those types of contact direction 476 metrics when predicting answer times using the learned queueing model. For example, the set of configurable queuing parameters may specify to use all types of contact direction 476 metrics, or just inbound/outbound 476 metrics, or just outbound channel 476 metrics, or just progressive outbound channel 476 metrics.

While in some embodiments a set of queuing model parameters are specified via a graphical user interface such as GUI 578, a set of queuing model parameters are specified via an application programming interface (API) call from a client device to contact center service 104 such as, for example, from a client device of a customer to the connect interface/API of contact center service 104 discussed above.

Figure 6:
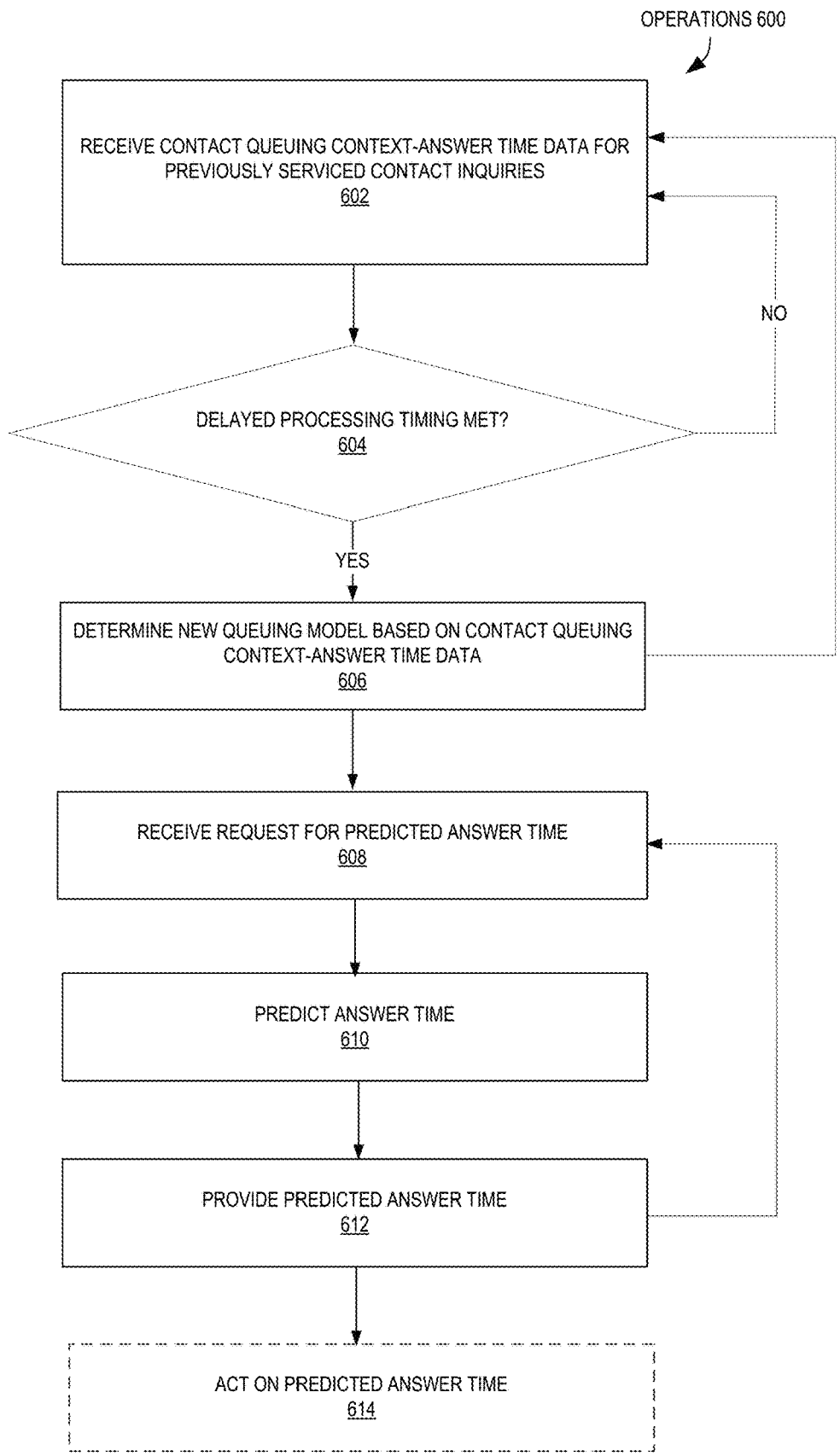
FIG. 6 is a flow diagram illustrating operations of a method for delayed processing for queuing model determination, according to some embodiments.

FIG. 6 is a flow diagram illustrating operations 600 of a method for delayed processing for queuing model determination, according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by provider network 100 of the other figures.

The operations 600 include, at block 602, receiving contact queuing context data for previously serviced contact inquiries. Receiving data may take any appropriate form. In some embodiments, data may be received from another system, may be received by another process, function, etc. within the same system, may be received in a shared memory space, such as a database, directory, etc. For example, a contact inquiry request system may have previously requested contact inquiries received from contacts be serviced by agents where contacts wait in queues while waiting for an agent to become available to service their contact inquiry, and context queuing context data may be received 602 indicating the queuing context of those previously serviced contact inquiries. The contact queuing context data and associated actual answer time may be stored in attached storage, cloud storage, or storage local to the receiving system, or in any other appropriate location.

Contact queuing context data may be received 602 in one form and stored in another form. In some embodiments, the received data may be indication of a queuing context for a previous contact inquiry serviced. The stored contact queuing context data may represent the queuing context numerically or in any appropriate form. For example, a contact inquiry handling system (e.g., of contact center service 104) may receive an indication that an agent completed wrap-up tasks for a contact inquiry after five minutes and twelve seconds of handle time. Therefore, the system may store an indication of "312 seconds" related to the handle time for the contact inquiry.

In some embodiments, receiving 602 contact queuing context data may include receiving metric data. For example, using the handle time example, when an agent has finished the wrap-up task for a contact inquiry, then contact queuing context data may be logged based on completing that task. For example, returning to the handle time example, when the handle time for the contact inquiry is logged, then the contact queuing context data may be received 602 based on obtaining the handle time from the log. In some embodiments, receiving 602 context queuing context data may be delayed or may be based on log data. For example, metrics related to servicing by agents of contact inquiries and contacts from queues may be stored in one or more log files or one or more databases and association of contact queuing context data with actual answer times may be based on processing the log file(s) or the data in the databases(s). Receiving 60 such contact queuing context data is delayed since it occurs after processing of the log file(s) or the data in the database(s).

If the delayed process (batch) timing has not been met 604, then process 600 will continue to collect contact queuing context data until the timing is met 604 (as depicted by the arrow from 604 to 602. In some embodiments, the delayed process timing is not met during a "batch window."

The delayed process or batch window timing may be any appropriate time period, such as one day, one hour, one minute, etc. In some embodiments, meeting 604 the batch timing may include the passage of a particular amount of time since the end of the previous delayed process period, or may be met by a certain real-world time (e.g., every 4 clock hours; or at 6 am, 9 am, noon, 3 μm, 6 pm, and midnight, etc.) In some embodiments, meeting the batch timing may also include received 602 a predetermined number of contact queuing context-actual answer time pairs. For example, in order to meet 604 the delayed processing timing, both a particular amount of time has to have passed and a certain number of contact inquiries have to be serviced. In some embodiments, meeting 604 the delayed batch timing may include only receiving 602 a certain number of contact inquiries, without a requirement for the passage of a certain amount of time.

The contact queuing context data for previously-serviced contact inquiries from a queue may be received 602 until a delayed processing timing is met 604. The timing might be met 604 when a twenty four-hour period has elapsed. Before that timing is met 604, more contact queuing context data for previous contact inquiries may continue to be received 602.

If the delayed process (or batch) timing is met 604, then process 600 will proceed by determining 606 a new queuing model based on the contact queuing context data received 602 during the delayed processing window. In some embodiments, determining the new queuing model includes learning the new queuing model using a supervised learning approach. In doing so, the contact queuing context data is transformed into features to use as training data for training the new queuing model. The associated actual answer times are used as labels for the training examples. In some embodiments, the supervised learning approach used is linear regression, gradient descent (e.g., batch gradient descent, stochastic gradient descent, or mini-batch gradient descent), polynomial regression, or a regularized linear model approach (e.g., ridge regression, lass regression, or Elastic Net). However, other types of supervised learning approaches can be used including, for example, Support Vector Regression (SVR), Temporal Convolutional Network (TCN), Long Short-Term Memory (LSTM) neural network, or Random Forest Regressor (RF).

In some embodiments, over time, the delayed processing window will close multiple times, each time a new queuing model will be determined 606. Receiving 608 a request for a predicted answer time may include receiving an indication that an answer time prediction is needed. In some embodiments, the request for a predicted answer time may be received 608 along with target contact queuing context that defines important information about the request. For example, the context received may include all of the set of queuing metrics 452 about the target contact queuing context.

Requests may be received 608 from or on behalf of contact inquiries from contacts. For example, requests for predicted answer time may be received 608 by ML inference service 116 from contact center service 104 on behalf of a contact inquiry by a contact just before, just after, or contemporaneous with contact center service 104 adding the contact in queue 114. More generally, a request may be received 608 whenever an answer time prediction is desired. For example, a request may be received 608 when an initial answer time prediction is desired such as just before, just after, or contemporaneous with a contact being added to a queue, or a request may be received 608 when an updated answer time prediction is desired such as while the contact is waiting in the queue.

After the request for a predicted answer time is received 608, an answer time may be predicted 610 and the predicted answer time may be provided 612 in response to the request. Determining 610 a predicted answer time for the request may include using contact queuing context associated with the request and the most recent queuing model for the queue. For example, if a request for an answer time prediction has been received 608, then the most recently determined 606 queuing model may be used to predict 610 the answer time for the received 608 request. For example, it may be predicted 608 that the answer time for the contact inquiry is seventeen minutes.

After the answer time is predicted 610, it may be provided 612 in response to the original request received 608. The response may be provided 612 by sending the response to the requestor, by writing the answer time prediction to data storage, by sending the predicted answer time to the contact via a contact communications channel (e.g., by phone or chat channel), or in any other appropriate manner.

Responses may be provided 612 to the original requester or to a system or device that will act on the requests. For example, one system may determine that the predicted answer time is sufficiently long (e.g., greater than a threshold) that contact should be given the option for an agent to call the contact back when an agent becomes available to handle the contact's contact inquiry.

Some embodiments include acting 614 on the predicted answer time (depicted as optional in FIG. 6). This may entail providing the predicted answer time to the contact via a contact communications channel or taking another action such as providing the contact the option for a call back. The answer time prediction can be provided to a contact in a variety of different ways including by aurally presenting the predicted answer time via a speaker of a personal electronic device in proximity to the contact. The personal electronic device may be a mobile phone, or an in-home virtual assistant device supported by cloud-based virtual assistant technology such as the AMAZON ALEXA technology developed by AMAZON of Seattle Wash. or the like. The answer time prediction can be provided to the contact in other ways such as in an email or text message sent to the contact or in a web page presented to the contact.

Figure 7:
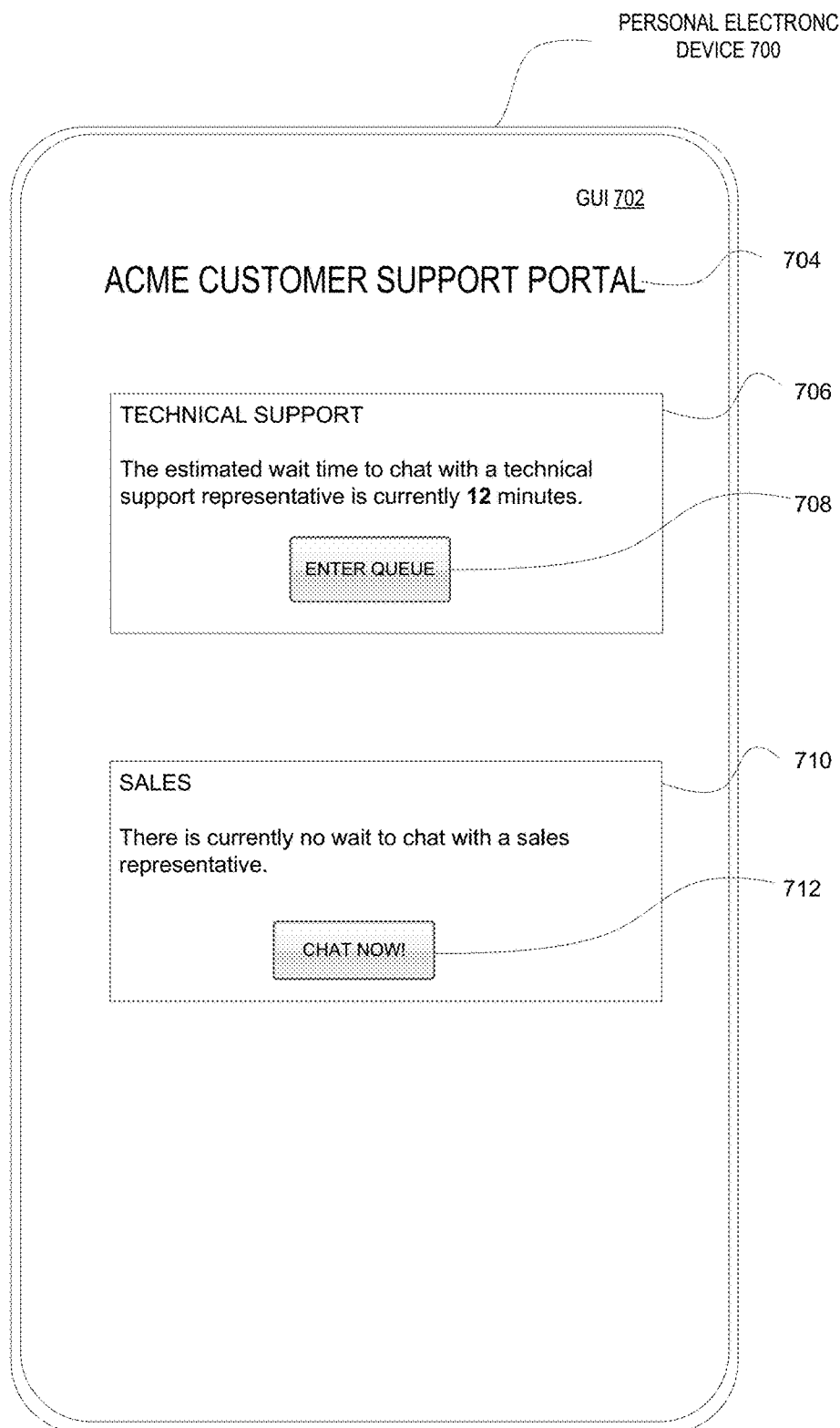
FIG. 7 illustrates an example graphical user interface in which an answer time prediction is provided, according to some embodiments.

In some embodiments, the action 614 taken on the predicted answer time includes causing an answer time prediction to be presented in a graphical user interface at a personal electronic device of a contact before the contact has taken an express action that indicates that the contact is willing to wait in a queue or interact with an agent. For example, the contact may use a personal electronic device to navigate to a web page of a customer of provider network 100. The web page may provide customer support options to the contact. FIG. 7 depicts an example of such a graphical user interface. In particular, FIG. 7 illustrates graphical user interface 702 presented at personal electronic device 700 of contact 102. In this example, the customer of the provider network that hosts their contact center services with provider network 100 is the "ACME" corporation as indicated by banner text 704. For example, GUI 702 may be a web page served to personal electronic device 700 by a server of ACME's web site. GUI 702 represents a customer support portal of the ACME corporation. In this example, ACME's customer support portal provides contacts the option to chat with an ACME technical support representative or an ACME sales representative. For each, GUI 702 provides an answer time prediction obtained from contact center service 104 of provider network 100. For example, a server of ACME's web site or code within the web page that is served from ACME's web site to personal electronic device 700 may make an API call (e.g., a REST call) to contact center service 104 to obtain the answer time predictions. In this example, the current predicted answer time to chat with a technical support representative is twelve minutes as indicated by GUI element 706. GUI 702 provides selectable GUI element (e.g., button) 708 that allows the contact to enter the queue to chat with a technical support representative. Upon selecting GUI element 708, the contact may be added to the technical support queue and GUI 702 including GUI element 706 may automatically and periodically refresh/update to indicate updated answer time predictions as the contact continues to wait in the queue. In this example, there is currently no wait to chat with a sales representative. This may be determined based on the answer time prediction being less than a threshold (e.g., one minute or less than 30 seconds). The contact is offered the option "Chat Now!" with a sales representative via selectable GUI element (button) 712. Upon selection of GUI element 712, a chat session may be initiated with a sales representative (e.g., agent 126).

In various embodiments, the queueing model changes over time based on new data relate to contact inquiries serviced and actual answer times observed. This can be beneficial (e.g., as compared to other techniques), because the needs the queuing model is addressing may change over time. For example, it may be the case that one month a certain regular low volume queuing pattern is observed, but after a new product is released, a higher volume more erratic queuing pattern happens.

Figure 8:
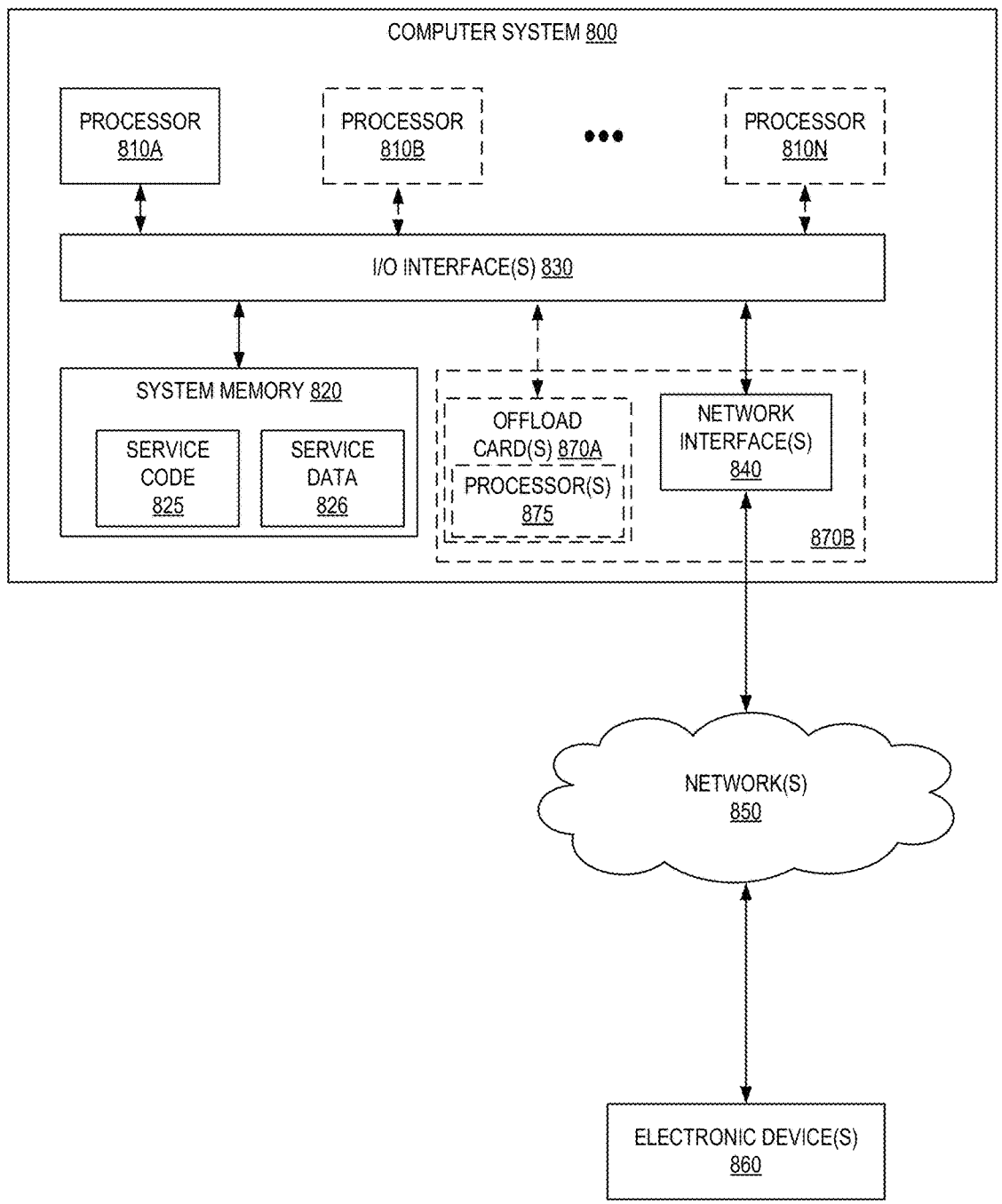
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as service code 825 (e.g., executable to implement, in whole or in part, provider network 100) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-710N of the computer system 800. However, in some embodiments the virtualization manager implemented by the offload card(s) 870A or 870B can accommodate requests from other entities (e.g., from compute instances themselves), and cannot coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP/S servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

What is claimed is:

1. A computer-implemented method for answer time prediction in a provider network, the method comprising:
   while a delayed processing timing has not been met, receiving, at the provider network, a set of contact queuing context-actual answer time data for a set of contact inquiries serviced as a first set of contact queuing context-actual answer time data, wherein a set of answer times were predicted for the set of contact inquiries based on a previous version of a queuing model, and wherein the previous version of the queuing model was learned based on a previous set of contact queuing context-actual answer time data for a previous set of contact inquires serviced, wherein the provider network is implemented by one or more electronic devices;
   when the delayed processing timing has been met, learning, at the provider network, a new queuing model using a supervised learning approach and in which (a) contact queuing context data of the first set of contact queuing context-actual answer time data is used to generate a set of training examples for the learning and (b) actual answer times of the first set of contact queuing context-actual answer time data are used as labels of the set of training examples for the learning;
   receiving, at the provider network, a request to predict an answer time for a target contact queuing context;
   predicting, at the provider network, an answer time for the target contact queuing context based on the new queuing model; and
   providing, by the provider network, the answer time prediction in a contact communications channel.

2. The computer-implemented method of claim 1, wherein learning the new queuing model is based on the previous set of contact queuing context-actual answer time data for the previous set of contact inquiries serviced or the previous version of the queuing model.

3. The computer-implemented method of claim 1, wherein the first set of contact queuing context-actual answer time data comprises contact queuing context data for each contact inquiry in the set of contact inquiries; and wherein each contact queuing context data for each contact inquiry in the set of contact inquiries comprises one or more of the following metrics pertaining the contact inquiry: average handle time, average queue answer time, agents in after contact work, agents on contact, contacts in queue, oldest contact in queue, queue name, time of day, day of week, month of year, channel, or contact direction.

4. A computer-implemented method for answer time prediction in a provider network, the method comprising:
   receiving, at the provider network, a set of contact queuing context-actual answer time data for a set of contact inquiries serviced as a first set of contact queuing context-actual answer time data, wherein a set of answer times were predicted for the set of contact inquiries based on a previous version of a queuing model, and wherein the previous version of the queuing model was learned based on a previous set of contact queuing context-actual answer time data for a previous set of contact inquires serviced, wherein the provider network is implemented by one or more electronic devices;
   learning, at the provider network, a new queuing model based on the first set of contact queuing context-actual answer time data and the previous set of contact queuing context-actual answer time data for the previous set of contact inquiries serviced or the previous version of the queuing model;
   receiving, at the provider network, a request to predict an answer time for a target contact queuing context;
   predicting, at the provider network, an answer time for the target contact queuing context based on the new queuing model; and
   providing, by the provider network, the answer time prediction to an electronic device that sent the request to predict an answer time for the target contact queuing context.

5. The computer-implemented method of claim 4, wherein the method further comprises performing an action based on the answer time prediction comprising providing the answer time prediction in a contact communications channel.

6. The computer-implemented method of claim 5, wherein the contact communications channel is a phone channel or a chat channel.

7. The computer-implemented method of claim 4, wherein the method further comprises:
   learning the new queuing model using a supervised learning approach and in which contact queuing context data of the first set of contact queuing context-actual answer time data is used to generate a set of training examples for the learning and actual answer times of the first set of contact queuing context-actual answer time data is used as labels of the set of training examples for the learning.

8. The computer-implemented method of claim 4, wherein the first set of contact queuing context-actual answer time data comprises contact queuing context data for each contact inquiry in the set of contact inquiries; and wherein each contact queuing context data for each contact inquiry in the set of contact inquiries comprises one or more of the following metrics pertaining the contact inquiry: average handle time, average queue answer time, agents in after contact work, agents on contact, contacts in queue, oldest contact in queue, queue name, time of day, day of week, month of year, channel, or contact direction.

9. The computer-implemented method of claim 4, wherein the new queuing model is learned based on the previous set of contact queuing context-actual answer time data for the previous set of contact inquiries serviced.

10. The computer-implemented method of claim 4, wherein the new queuing model is learned based on the previous version of the queuing model.

11. The computer-implemented method of claim 4, wherein the method further comprises:
    sending the request to predict the answer time for the target contact queuing context in response to receiving a contact inquiry from a contact via a contact communications channel.

12. The computer-implemented method of claim 4, further comprising:
    learning the new queuing model based on a delayed processing timing being met; and
    wherein the delayed processing timing is met based on an expiration of a timer.

13. The computer-implemented method of claim 4, further comprising:
    learning the new queuing model based on a delayed processing timing being met; and
    wherein the delayed processing timing is met based on a size of the first set of contact queuing context-actual answer time data exceeding a threshold size.

14. The computer-implemented method of claim 4, wherein the new queuing model is learned on a relearning frequency; and wherein the first set of contact queuing context-actual answer time data and the first set of contact queuing context-actual answer time data encompasses a past training window of time.

15. A system comprising:
    a first one or more electronic devices to implement a contact center service in a provider network, the contact center service including instructions that upon execution cause the contact center service to:
    receive, while a delayed processing timing has not been met, a set of contact queuing context-actual answer time data for a set of contact inquiries serviced as a first set of contact queuing context-actual answer time data, wherein a set of answer times were predicted for the set of contact inquiries based on a previous version of a queuing model, and wherein the previous version of the queuing model was learned based on a previous set of contact queuing context-actual answer time data for a previous set of contact inquires serviced; and
    provide, via a contact communications channel, an answer time prediction for a target contact queuing context based on a new queuing model;
    a second one or more electronic devices to implement a machine learning training service in the provider network, the machine learning training service including instructions that upon execution cause the machine learning training service to:
    learn, when the delayed processing timing has been met, the new queuing model based on the first set of contact queuing context-actual answer time data and the previous set of contact queuing context-actual answer time data for the previous set of contact inquiries serviced or the previous version of the queuing model;
    a third one or more electronic devices to implement a machine learning inference service in the provider network, the machine learning inference service including instructions that upon execution cause the machine learning inference service to:
    receive a request to predict the answer time for the target contact queuing context; and
    predict the answer time for the target contact queuing context based on the new queuing model.

16. The system of claim 15, wherein the contact center service includes instructions that upon execution cause the contact center service to perform an action based on the answer time prediction.

17. The system of claim 15, wherein the machine learning training service includes instructions that upon execution cause the machine learning training service to learn the new queuing model using a supervised learning approach and in which contact queuing context data of the first set of contact queuing context-actual answer time data is used to generate a set of training examples for the learning and actual answer times of the first set of contact queuing context-actual answer time data is used as labels of the set of training examples for the learning.

18. The system of claim 15, wherein the first set of contact queuing context-actual answer time data comprises contact queuing context data for each contact inquiry in the set of contact inquiries; and wherein each contact queuing context data for each contact inquiry in the set of contact inquiries comprises one or more of the following metrics pertaining the contact inquiry: average handle time, average queue answer time, agents in after contact work, agents on contact, contacts in queue, oldest contact in queue, queue name, time of day, day of week, channel, or blending.

19. The system of claim 15, wherein the contact communications channel is a phone channel or a chat channel.

20. The system of claim 15, wherein the contact center service includes instructions that upon execution cause the contact center service to send the request to predict the answer time for the target contact queuing context in response to receiving a contact inquiry from a contact via the contact communications channel.

* * * * *